United States Patent
Handelman

(10) Patent No.: US 9,344,187 B2
(45) Date of Patent: May 17, 2016

(54) APPARATUS AND METHODS FOR ENABLING RECOVERY IN OPTICAL NETWORKS

(71) Applicant: Doron Handelman, Givatayim (IL)

(72) Inventor: Doron Handelman, Givatayim (IL)

(*) Notice: Subject to any disclaimer, the term of this patent is extended or adjusted under 35 U.S.C. 154(b) by 62 days.

(21) Appl. No.: 14/029,216

(22) Filed: Sep. 17, 2013

(65) Prior Publication Data
US 2015/0078739 A1    Mar. 19, 2015

(51) Int. Cl.
| | | |
|---|---|---|
| H04B 10/12 | (2006.01) | |
| H04J 14/02 | (2006.01) | |
| H04Q 11/00 | (2006.01) | |
| H04B 10/032 | (2013.01) | |
| H04L 12/24 | (2006.01) | |

(52) U.S. Cl.
CPC .......... *H04B 10/032* (2013.01); *H04L 41/0668* (2013.01); *H04Q 11/0062* (2013.01); *H04Q 2011/0081* (2013.01)

(58) Field of Classification Search
CPC ........................ H04B 10/032; H04Q 11/0062
USPC ......................................................... 398/1, 2
See application file for complete search history.

(56) References Cited

U.S. PATENT DOCUMENTS

| | | |
|---|---|---|
| 6,404,522 B1 | 6/2002 | Handelman |
| 6,574,018 B1 | 6/2003 | Handelman |
| 6,763,191 B1 | 7/2004 | Handelman |
| 6,822,979 B2 | 11/2004 | Daiber |
| 6,892,032 B2 | 5/2005 | Milton et al. |
| 6,983,342 B2 | 1/2006 | Helenic et al. |
| 7,072,584 B1 * | 7/2006 | Lichtman et al. ............... 398/59 |
| 7,099,578 B1 * | 8/2006 | Gerstel ............................ 398/5 |
| 7,099,587 B2 | 8/2006 | Handelman |
| 7,106,967 B2 | 9/2006 | Handelman |
| 7,162,155 B2 | 1/2007 | Handelman |
| 7,167,443 B1 | 1/2007 | Dantu et al. |
| 7,167,620 B2 | 1/2007 | Handelman |

(Continued)

OTHER PUBLICATIONS

Bottorff et al, Scaling Provider Ethernet, IEEE Communications Magazine, Sep. 2008, pp. 104-109, vol. 46, No. 9, The Institute of Electrical and Electronics Engineers, Inc., USA.

(Continued)

*Primary Examiner* — Oommen Jacob
(74) *Attorney, Agent, or Firm* — Louis J. Hoffman; William E. Markov

(57) ABSTRACT

Apparatus for enabling an M:N recovery scheme in an optical network includes a set of N working DSP-enabled optical transceivers/transponders including at least one working DSP-enabled optical transceiver/transponder that uses a first set of transmission parameters and at least one working DSP-enabled optical transceiver/transponder that uses a second set of transmission parameters which is different from the first set of transmission parameters, and a set of M protection DSP-enabled optical transceivers/transponders operable to protect the set of N working DSP-enabled optical transceivers/transponders and including L protection DSP-enabled optical transceivers/transponders, each having a capability of using a set of adjustable transmission parameters enabling it to protect every one of the N working DSP-enabled optical transceivers/transponders, and, when M>L, M−L protection DSP-enabled optical transceivers/transponders, each having a capability of protecting at least one, but not all, of the N working DSP-enabled optical transceivers/transponders. Related network and methods are also disclosed.

24 Claims, 7 Drawing Sheets

(56) References Cited

U.S. PATENT DOCUMENTS

| | | | |
|---|---|---|---|
| 7,181,139 B2 | 2/2007 | Handelman et al. | |
| 7,188,280 B2 | 3/2007 | Shinomiya et al. | |
| 7,233,738 B2* | 6/2007 | Kerfoot, III | H04J 14/029 398/10 |
| 7,460,783 B2 | 12/2008 | Fumagalli et al. | |
| 7,570,844 B2 | 8/2009 | Handelman | |
| 7,586,838 B2* | 9/2009 | Sonoda | 370/216 |
| 7,827,589 B2 | 11/2010 | Briggs | |
| 7,965,712 B2 | 6/2011 | Handelman | |
| 8,467,676 B2* | 6/2013 | Villarruel | H04B 10/032 398/10 |
| 8,554,075 B2 | 10/2013 | Mizutani et al. | |
| 8,693,374 B1 | 4/2014 | Murphy et al. | |
| 8,718,465 B1* | 5/2014 | Sahebekhtiari et al. | 398/2 |
| 8,731,397 B2* | 5/2014 | Zhang | 398/3 |
| 8,904,080 B2 | 12/2014 | Martin et al. | |
| 8,953,936 B2* | 2/2015 | Hood | 398/66 |
| 2002/0145779 A1 | 10/2002 | Strasser et al. | |
| 2002/0181503 A1 | 12/2002 | Montgomery, Jr. | |
| 2003/0156841 A1 | 8/2003 | Chraplyvy et al. | |
| 2003/0223465 A1 | 12/2003 | Blanchard | |
| 2005/0089126 A1 | 4/2005 | Zerbe et al. | |
| 2006/0024058 A1* | 2/2006 | Nabeyama | H04B 10/032 398/79 |
| 2008/0050118 A1 | 2/2008 | Haran et al. | |
| 2010/0046365 A1* | 2/2010 | Ozaki | 370/220 |
| 2010/0232784 A1 | 9/2010 | Rarick et al. | |
| 2014/0093232 A1* | 4/2014 | Hood | H04B 10/032 398/5 |
| 2014/0301192 A1 | 10/2014 | Lee et al. | |
| 2014/0334286 A1 | 11/2014 | Ernström et al. | |
| 2015/0078739 A1* | 3/2015 | Handelman | H04B 10/032 398/2 |

OTHER PUBLICATIONS

Takács et al, GMPLS Controlled Ethernet: An Emerging Packet-Oriented Transport Technology, IEEE Communications Magazine, Sep. 2008, pp. 118-124, vol. 46, No. 9, The Institute of Electrical and Electronics Engineers, Inc., USA.

Ryoo et al, Ethernet Ring Protection for Carrier Ethernet Networks, IEEE Communications Magazine, Sep. 2008, pp. 136-143, vol. 46, No. 9, The Institute of Electrical and Electronics Engineers, Inc., USA.

Helvoort et al, Standards bring more flexibility to optical transport, Optical Networks Magazine, Jan./Feb. 2003, pp. 53-58.

Fendick et al, Global optical Ethernet, Optical Networks Magazine, Jan./Feb. 2003, pp. 70-79.

Jajszczyk, Automatically Switched Optical Networks: Benefits and Requirements, IEEE Optical Communications, Feb. 2005, pp. S10-S15, vol. 43, No. 2, The Institute of Electrical and Electronics Engineers, Inc., USA.

Luo et al, Bandwidth Allocation for Multiservice Access on EPONs, IEEE Optical Communications, Feb. 2005, pp. S16-S21, vol. 43, No. 2, The Institute of Electrical and Electronics Engineers, Inc., USA.

Kang et al., Link Aggregation Member Interface Status Signal, Internet Draft draft-zi-pwe3-link-aggr-member-status-00.txt, Oct. 17, 2005, 17 pages, IETF.

Wellbrock et al, The Road to 100G Deployment, IEEE Communications Magazine, Mar. 2010, pp. S14-S18, vol. 48, No. 3, The Institute of Electrical and Electronics Engineers, Inc., USA.

Roese et al, Optical Transport Network Evolving with 100 Gigabit Ethernet, IEEE Communications Magazine, Mar. 2010, pp. S28-S34, vol. 48, No. 3, The Institute of Electrical and Electronics Engineers, Inc., USA.

Winzer, Beyond 100G Ethernet, IEEE Communications Magazine, Jul. 2010, pp. 26-30, vol. 48, No. 7, The Institute of Electrical and Electronics Engineers, Inc., USA.

D'Ambrosia et al, CEI-28G: Paving the Way for 100 Gigabit, www.oiforum.com, Apr. 2, 2009, 8 pages, OIF—Optical Internetworking Forum, ethernet alliance.

Berthold et al, 100G Ultra Long Haul DWDM Framework Document, OIF-FD-100G-DWDM-01.0, www.oiforum.com, Jun. 2009, 10 pages, OIF—Optical Internetworking Forum, www.oiforum.com/public/impagreements.html.

Srivastava, Implementation Agreement for Generation 2.0 100G Long-Haul DWDM Transmission Module—Electromechanical (GEN.2 MSA-100GLH), OIF-MSA-100GLH-EM-02.0, the Physical and Link Layer (PLL) Working Group of the Optical Internetworking Forum (OIF), Aug. 27, 2013, www.oiforum.com/public/impagreements.html.

Mantelet et al, PCE-Based Centralized Control Plane for Filterless Networks, IEEE Communications Magazine, May 2013, pp. 128-135, vol. 51, No. 5, The Institute of Electrical and Electronics Engineers, Inc., USA.

Yeganeh et al, On Scalability of Software-Defined Networking, IEEE Communications Magazine, Feb. 2013, pp. 136-141, vol. 51, No. 2, The Institute of Electrical and Electronics Engineers, Inc., USA.

Yoshimoto et al, DSP-Based Optical Access Approaches for Enhancing NG-PON2 Systems, IEEE Communications Magazine, Mar. 2013, pp. 58-64, vol. 51, No. 3, The Institute of Electrical and Electronics Engineers, Inc., USA.

Collings, New Devices Enabling Software-Defined Optical Networks, IEEE Communications Magazine, Mar. 2013, pp. 66-71, vol. 51, No. 3, The Institute of Electrical and Electronics Engineers, Inc., USA.

Bitar et al, Technologies and Protocols for Data Center and Cloud Networking, IEEE Communications Magazine, Sep. 2013, pp. 24-31, vol. 51, No. 9, The Institute of Electrical and Electronics Engineers, Inc., USA.

Zhao et al, The Prospect of Inter-Data-Center Optical Networks, IEEE Communications Magazine, Sep. 2013, pp. 32-38, vol. 51, No. 9, The Institute of Electrical and Electronics Engineers, Inc., USA.

Anderson, Implementation Agreement for 100G Long-Haul DWDM Transmission Module—Electromechanical (MSA-100GLH), OIF-MSA-100GLH-EM-01.1, the Physical and Link Layer (PLL) Working Group of the Optical Internetworking Forum (OIF), Sep. 20, 2011, www.oiforum.com/public/impagreements.html.

Liotta, Antonio; The Cognitive Net Is Coming; Spectrum, IEEE, vol. 50, Issue 8; Aug. 2013; pp. 26-31.

Zhou et al, Rate-Adaptable Optics for Next Generation Long-Haul Transport Networks, IEEE Communications Magazine, Mar. 2013, pp. 41-49, vol. 51, No. 3, The Institute of Electrical and Electronics Engineers, Inc., USA.

Gringeri et al, Extending Software Defined Network Principles to Include Optical Transport, IEEE Communications Magazine, Mar. 2013, pp. 32-40, vol. 51, No. 3, The Institute of Electrical and Electronics Engineers, Inc., USA.

Shen et al, Spectrum-Efficient and Agile CO-OFDM Optical Transport Networks: Architecture, Design, and Operation, IEEE Communications Magazine, May 2012, pp. 82-89, vol. 50, No. 5, The Institute of Electrical and Electronics Engineers, Inc., USA.

Jinno et al, Spectrum-Efficient and Scalable Elastic Optical Path Network: Architecture, Benefits, and Enabling Technologies, IEEE Communications Magazine, Nov. 2009, pp. 66-73, vol. 47, No. 11, The Institute of Electrical and Electronics Engineers, Inc., USA.

Miyamoto et al, Advanced Optical Modulation and Multiplexing Technologies for High-Capacity OTN Based on 100 Gb/s Channel and Beyond, IEEE Communications Magazine, Mar. 2010, pp. S65-S72, vol. 48, No. 3, The Institute of Electrical and Electronics Engineers, Inc., USA.

Cole et al, Higher-Order Modulation for Client Optics, IEEE Communications Magazine, Mar. 2013, pp. 50-57, vol. 51, No. 3, The Institute of Electrical and Electronics Engineers, Inc., USA.

Griffith, IETF Work on Protection and Restoration for Optical Networks, Optical Networks Magazine, Jul./Aug. 2003, pp. 101-106.

Anderson et al, Optical Transceivers for 100 Gigabit Ethernet and its Transport, IEEE Communications Magazine, Mar. 2010, pp. S35-S40, vol. 48, No. 3, The Institute of Electrical and Electronics Engineers, Inc., USA.

Yu et al, Ultra-High-Capacity DWDM Transmission System for 100G and Beyond, IEEE Communications Magazine, Mar. 2010, pp. S56-S64, vol. 48, No. 3, The Institute of Electrical and Electronics Engineers, Inc., USA.

(56) References Cited

OTHER PUBLICATIONS

Aoki et al, Next-Generation 100 Gb/s Undersea Optical Communications, IEEE Communications Magazine, Feb. 2012, pp. S50-S57, vol. 50, No. 2, The Institute of Electrical and Electronics Engineers, Inc., USA.
Bouda, Implementation Agreement for Integrated Polarization Multiplexed Quadrature Modulated Transmitters, Implementation Agreement IA # OIF-PMQ-TX-01.0, the Physical and Link Layer (PLL) Working Group of the Optical Internetworking Forum (OIF), Mar. 12, 2010, www.oiforum.com/public/impagreements.html.
Ticknor, Implementation Agreement for Integrated Dual Polarization Intradyne Coherent Receivers, Implementation Agreement IA # OIF-DPC-RX-01.1, the Physical and Link Layer (PLL) Working Group of the Optical Internetworking Forum (OIF), Sep. 20, 2011, www.oiforum.com/public/impagreements.html.
U.S. Appl. No. 13/558,166 of Handelman, filed Jul. 25, 2012.
U.S. Appl. No. 13/731,039 of Handelman, filed Dec. 30, 2012.
Spectral grids for WDM applications: DWDM frequency grid, Edition 2.0 of Recommendation ITU-T G.694.1 (Feb. 2012), Feb. 2012, 16 pages, International Telecommunication Union (ITU).
Gringeri et al, Flexible Architectures for Optical Transport Nodes and Networks, IEEE Communications Magazine, Jul. 2010, pp. 40-50, vol. 48, No. 7, The Institute of Electrical and Electronics Engineers, Inc., USA.
Roberts et al, 100G and Beyond with Digital Coherent Signal Processing, IEEE Communications Magazine, Jul. 2010, pp. 62-69, vol. 48, No. 7, The Institute of Electrical and Electronics Engineers, Inc., USA.
Gerstel et al, Elastic Optical Networking: A New Dawn for the Optical Layer?, IEEE Communications Magazine, Feb. 2012, pp. S12-S20, vol. 50, No. 2, The Institute of Electrical and Electronics Engineers, Inc., USA.
Lang et al., Generalized Multi-Protocol Label Switching (GMPLS) Recovery Functional Specification, Internet Draft draft-ietf-ccamp-gmpls-recovery-functional-03.txt, Oct. 2004, 18 pages, IETF.
Berger, Generalized Multi-Protocol Label Switching (GMPLS) Signaling Functional Description, RFC3471, Jan. 2003, 34 pages, Internet Society.
Hardy, Alcatel-Lucent makes 400-Gbps play, Lightwave, www.lightwaveonline.com, Mar. 6, 2012, 2 pages, PennWell Corporation.
ZTE displays 400-Gbps and 1-Tbps DWDM prototype, Lightwave, www.lightwaveonline.com, Jun. 18, 2012, 2 pages, PennWell Corporation.
Hardy, Infinera offers Instant Bandwidth on DTN-X packet optical transport platform, Lightwave, www.lightwaveonline.com, Nov. 12, 2012, 3 pages, PennWell Corporation.
Allen et al., Digital Optical Networks Using Photonic Integrated Circuits (PICs) Address the Challenges of Reconfigurable Optical Networks, IEEE Communications Magazine, Jan. 2008, pp. 35-43, vol. 46, No. 1, The Institute of Electrical and Electronics Engineers, Inc., USA.
Melle et al., Bandwidth Virtualization Enables Long-Haul WDM Transport of 40 Gb/s and 100 Gb/s Services, IEEE Communications Magazine, Feb. 2008, pp. S22-S29, vol. 46, No. 2, The Institute of Electrical and Electronics Engineers, Inc., USA.
Gringeri et al, Technical Considerations for Supporting Data Rates Beyond 100 Gb/s, IEEE Communications Magazine, Feb. 2012, pp. S21-S30, vol. 50, No. 2, The Institute of Electrical and Electronics Engineers, Inc., USA.
Hardy, Infinera lays out 40G/100G coherent roadmap, Lightwave, www.lightwaveonline.com, May 20, 2010, 1 page, PennWell Corporation.
Jinno et al, Multiflow Optical Transponder for Efficient Multilayer Optical Networking, IEEE Communications Magazine, May 2012, pp. 56-65, vol. 50, No. 5, The Institute of Electrical and Electronics Engineers, Inc., USA.
Ye et al, A Simple Dynamic Integrated Provisioning/Protection Scheme in IP over WDM Networks, IEEE Communications Magazine, Nov. 2001, pp. 174-182, vol. 39, No. 11, The Institute of Electrical and Electronics Engineers, Inc., USA.
Roorda et al, Restoration schemes for agile photonic networks, Lightwave Europe, www.lightwave-europe.com, Aug. 2003, pp. 10 and 12.
Rajagopalan et al, IP over Optical Networks: Architectural Aspects, IEEE Communications Magazine, Sep. 2000, pp. 94-102, vol. 38, No. 9, The Institute of Electrical and Electronics Engineers, Inc., USA.
Appelman et al, All-Optical Switching Technologies for Protection Applications, IEEE Optical Communications, Nov. 2004, pp. S35-S40, vol. 42, No. 11, The Institute of Electrical and Electronics Engineers, Inc., USA.
Maesschalck et al, Intelligent Optical Networking for Multilayer Survivability, IEEE Communications Magazine, Jan. 2002, pp. 42-49, vol. 40, No. 1, The Institute of Electrical and Electronics Engineers, Inc., USA.
Sambo et al, Toward High-Rate and Flexible Optical Networks, IEEE Communications Magazine, May 2012, pp. 66-72, vol. 50, No. 5, The Institute of Electrical and Electronics Engineers, Inc., USA.
Ellinas et al, Routing and restoration architectures in mesh optical networks, Optical Networks Magazine, Jan./Feb. 2003, pp. 91-106.
Androulidakis et al, Service Differentiation and Traffic Engineering in IP over WDM Networks, IEEE Communications Magazine, May 2008, pp. 52-59, vol. 46, No. 5, The Institute of Electrical and Electronics Engineers, Inc., USA.
Manzalini et al, Architecture and Functional Requirements of Control Planes for Automatic Switched Optical Networks: Experience of the IST Project LION, IEEE Communications Magazine, Nov. 2002, pp. 60-65, vol. 40, No. 11, The Institute of Electrical and Electronics Engineers, Inc., USA.
Xie et al, A Dynamic Bandwidth Allocation Scheme for Differentiated Services in EPONs, IEEE Optical Communications, Aug. 2004, pp. S32-S39, vol. 42, No. 8, The Institute of Electrical and Electronics Engineers, Inc., USA.
Chiu et al, Control plane considerations for all-optical and multi-domain optical networks and their status in OIF and IETF, Optical Networks Magazine, Jan./Feb. 2003, pp. 26-35.
Taniguchi et al, Operational Evaluation of ASON/GMPLS Interdomain Capability over a JGN II Network Testbed IEEE Communications Magazine, May 2008, pp. 60-66, vol. 46, No. 5, The Institute of Electrical and Electronics Engineers, Inc., USA.
Zik, Enabling Highly Survivable Automated On-Demand Dynamic Network Services with Intelligent Optical Control Planes, IEEE Communications Magazine, Jul. 2008, pp. 154-157, vol. 46, No. 7, The Institute of Electrical and Electronics Engineers, Inc., USA.
Xia et al, High-Capacity Optical Transport Networks, IEEE Communications Magazine, Nov. 2012, pp. 170-178, vol. 50, No. 11, The Institute of Electrical and Electronics Engineers, Inc., USA.
Vass, Optical communications trends for 2011, Lightwave, www.lightwaveonline.com, Jan. 12, 2011, 3 pages, PennWell Corporation.
Jones et al, A Justification for a Variable Bandwidth Allocation methodology for SONET Virtually Concatenated SPEs, Jul. 10-14, 2000, 4 pages, T1X1.5/2000-157R1, a contribution to T1 standards project—T1X1.5.
Jones et al, A Proposed Link Capacity Adjustment Scheme (LCAS) for SONET Virtually Concatenated SPEs, Oct. 9-13, 2000, 30 pages, T1X1.5/2000-199, a contribution to T1 standards project—T1X1.5.
Link capacity adjustment scheme (LCAS) for virtual concatenated signals, ITU-T Recommendation G.7042/Y.1305, Feb. 2004, 32 pages, International Telecommunication Union (ITU).
Link capacity adjustment scheme (LCAS) for virtual concatenated signals, ITU-T Recommendation G.7042/Y.1305 (2004)—Corrigendum 1, Aug. 2004, 22 pages, International Telecommunication Union (ITU).
Jinno et al, Distance-Adaptive Spectrum Resource Allocation in Spectrum-Sliced Elastic Optical Path Network, IEEE Communications Magazine, Aug. 2010, pp. 138-145, vol. 48, No. 8, The Institute of Electrical and Electronics Engineers, Inc., USA.

(56) References Cited

OTHER PUBLICATIONS

Wei et al, Cognitive Optical Networks: Key Drivers, Enabling Techniques, and Adaptive Bandwidth Services, IEEE Communications Magazine, Jan. 2012, pp. 106-113, vol. 50, No. 1, The Institute of Electrical and Electronics Engineers, Inc., USA.

Reddy et al, Ethernet Aggregation and Transport Infrastructure OAM and Protection Issues, IEEE Communications Magazine, Feb. 2009, pp. 152-159, vol. 47, No. 2, The Institute of Electrical and Electronics Engineers, Inc., USA.

* cited by examiner

Fig. 5

500 — ENABLE AN M:N RECOVERY SCHEME IN AN OPTICAL NETWORK BY ALLOCATING A SET OF M PROTECTION DSP-ENABLED OPTICAL TRANSCEIVERS/TRANSPONDERS FOR PROTECTING A SET OF N WORKING DSP-ENABLED OPTICAL TRANSCEIVERS/TRANSPONDERS WHICH INCLUDES AT LEAST ONE WORKING DSP-ENABLED OPTICAL TRANSCEIVER/TRANSPONDER THAT USES A FIRST SET OF TRANSMISSION PARAMETERS AND AT LEAST ONE WORKING DSP-ENABLED OPTICAL TRANSCEIVER/TRANSPONDER THAT USES A SECOND SET OF TRANSMISSION PARAMETERS WHICH IS DIFFERENT FROM THE FIRST SET OF TRANSMISSION PARAMETERS, WHEREIN THE SET OF M PROTECTION DSP-ENABLED OPTICAL TRANSCEIVERS/TRANSPONDERS INCLUDES L PROTECTION DSP-ENABLED OPTICAL TRANSCEIVERS/TRANSPONDERS, EACH HAVING A CAPABILITY OF USING A SET OF ADJUSTABLE TRANSMISSION PARAMETERS ENABLING IT TO PROTECT EVERY ONE OF THE N WORKING DSP-ENABLED OPTICAL TRANSCEIVERS/TRANSPONDERS, AND, WHEN M>L, M-L PROTECTION DSP-ENABLED OPTICAL TRANSCEIVERS/TRANSPONDERS, EACH HAVING A CAPABILITY OF PROTECTING AT LEAST ONE, BUT NOT ALL, OF THE N WORKING DSP-ENABLED OPTICAL TRANSCEIVERS/TRANSPONDERS

ション System for 100G and Beyond", by Jianjun Yu and
APPARATUS AND METHODS FOR ENABLING RECOVERY IN OPTICAL NETWORKS

FIELD OF THE INVENTION

The present invention generally relates to optical networks, and more particularly to optical networks that utilize or are configured to utilize digital signal processing (DSP)-enabled optical transceivers/transponders.

BACKGROUND OF THE INVENTION

The following references are believed to represent the state of the art:

an article entitled "Rate-Adaptable Optics for Next Generation Long-Haul Transport Networks", by Xiang Zhou, Lynn E. Nelson, and Peter Magill, in IEEE Communications Magazine, March 2013, pages 41-49;

an article entitled "Extending Software Defined Network Principles to Include Optical Transport", by Steven Gringeri, Nabil Bitar, and Tiejun J. Xia, in IEEE Communications Magazine, March 2013, pages 32-40;

an article entitled "Spectrum-Efficient and Agile CO-OFDM Optical Transport Networks: Architecture, Design, and Operation", by Gangxiang Shen and Moshe Zukerman, in IEEE Communications Magazine, May 2012, pages 82-89;

an article entitled "Spectrum-Efficient and Scalable Elastic Optical Path Network: Architecture, Benefits, and Enabling Technologies", by Masahiko Jinno, Hidehiko Takara, Bartlomiej Kozicki, Yukio Tsukishima, Yoshiaki Sone, and Shinji Matsuoka, in IEEE Communications Magazine, November 2009, pages 66-73;

an article entitled "Advanced Optical Modulation and Multiplexing Technologies for High-Capacity OTN Based on 100 Gb/s Channel and Beyond", by Yutaka Miyamoto and Senichi Suzuki, in IEEE Communications Magazine, March 2010, pages S65-S72;

an article entitled "Higher-Order Modulation for Client Optics", by Chris Cole, Ilya Lyubomirsky, Ali Ghiasi, and Vivek Telang, in IEEE Communications Magazine, March 2013, pages 50-57;

an article entitled "IETF Work on Protection and Restoration for Optical Networks", by David W. Griffith in Optical Networks Magazine, July/August 2003, pages 101-106;

an article entitled "Optical Transceivers for 100 Gigabit Ethernet and its Transport", by Jon Anderson and Matthew Traverso, in IEEE Communications Magazine, March 2010, pages S35-S40;

an article entitled "Ultra-High-Capacity DWDM Transmission System for 100G and Beyond", by Jianjun Yu and Xiang Zhou, in IEEE Communications Magazine, March 2010, pages S56-S64;

an article entitled "Next-Generation 100 Gb/s Undersea Optical Communications", by Yasuhiro Aoki, Yoshihisa Inada, Takaaki Ogata, Lei Xu, Shaoliang Zhang, Fatih Yaman, and Eduardo Mateo, in IEEE Communications Magazine, February 2012, pages S50-S57;

an Implementation Agreement IA # OIF-PMQ-TX-01.0 entitled "Implementation Agreement for Integrated Polarization Multiplexed Quadrature Modulated Transmitters", technical editor Martin Bouda, of the Physical and Link Layer (PLL) Working Group of the Optical Internetworking Forum (OIF), dated Mar. 12, 2010, available on the World Wide Web at www.oiforum.com/public/impagreements.html; and an Implementation Agreement IA # OIF-DPC-RX-01.1 entitled "Implementation Agreement for Integrated Dual Polarization Intradyne Coherent Receivers", maintenance editor Anthony J. Ticknor, of the Physical and Link Layer (PLL) Working Group of the Optical Internetworking Forum (OIF), dated Sep. 20, 2011 available on the World Wide Web at www.oiforum.com/public/impagreements.html.

SUMMARY OF THE INVENTION

Certain embodiments of the present invention provide apparatus and methods for enabling recovery in optical networks that utilize or are configured to utilize digital signal processing (DSP)-enabled optical transceivers/transponders.

The term "recovery" is used throughout the present specification and claims to denote both types of recovery, namely protection and restoration.

The term "optical transceiver" is used throughout the present specification and claims to include a combination of an optical transmitter and an optical receiver. The term "optical transponder" is used throughout the present specification and claims to include a device which includes an optical transmitter and an optical receiver and hence an optical transceiver. The term "optical transceiver/transponder" is used throughout the present specification and claims to include an optical transceiver which may be provided as a stand-alone optical unit, or be part of an optical transponder, or be embodied in a unit.

The term "DSP-enabled optical transceiver/transponder" is used throughout the present specification and claims to include an optical transceiver/transponder that includes, or is associated with, a Digital Signal Processor or Application Specific Integrated Circuit (DSP/ASIC) that is used to process electrical signals before their transmission in an optical form and to process received signals after their conversion from an optical form into an electrical form. Such signal processing by the DSP/ASIC is typically intended to perform operations such as, but not limited to, chromatic dispersion (CD) compensation after reception, and/or forward error correction (FEC) coding before transmission and FEC decoding after reception. Accordingly, the term "DSP-enabled optical transmitter" is used throughout the present specification and claims to include an optical transmitter that includes, or is associated with, a DSP/ASIC that is used to process electrical signals before their transmission in an optical form, and the term "DSP-enabled optical receiver" is used throughout the present specification and claims to include an optical receiver that includes, or is associated with, a DSP/ASIC that is used to process received signals after their conversion from an optical form into an electrical form.

The term "failure" is used throughout the present specification and claims in connection with an optical transceiver/transponder to include a failure which disables operation of at least one of an optical transmitter and an optical receiver of the optical transceiver/transponder or degrades operation of the at least one of an optical transmitter and an optical receiver of the optical transceiver/transponder to an unacceptable level. In connection with a working path or link the term "failure" is used throughout the present specification and claims to include a failure which affects the working path or link in such a manner that communication is disabled over the working path or link or a quality of the communication over the working path or link is at an unacceptable level.

The term "link" is used throughout the present specification and claims to include a communication link with a plurality of paths.

There is thus provided in accordance with an embodiment of the present invention apparatus for enabling an M:N recovery scheme in an optical network, wherein M and N are positive integers and $1 \leq M < N$, the apparatus including a set of N working DSP-enabled optical transceivers/transponders which includes at least one working DSP-enabled optical transceiver/transponder that uses a first set of transmission parameters and at least one working DSP-enabled optical transceiver/transponder that uses a second set of transmission parameters which is different from the first set of transmission parameters, and a set of M protection DSP-enabled optical transceivers/transponders operable to protect the set of N working DSP-enabled optical transceivers/transponders and including L protection DSP-enabled optical transceivers/transponders, each having a capability of using a set of adjustable transmission parameters enabling it to protect every one of the N working DSP-enabled optical transceivers/transponders, and, when M>L, M−L protection DSP-enabled optical transceivers/transponders, each having a capability of protecting at least one, but not all, of the N working DSP-enabled optical transceivers/transponders, wherein L is a positive integer and $1 \leq L \leq M$.

In some embodiments, the transmission parameters of each of the first set of transmission parameters, the second set of transmission parameters, and each of the sets of adjustable transmission parameters usable by the L protection DSP-enabled optical transceivers/transponders include at least one of the following: a modulation scheme parameter, a forward error correction (FEC) coding overhead percent parameter, a symbol rate parameter, a parameter of a central wavelength of a channel wavelength, and a client port rate parameter.

In one embodiment, the modulation scheme parameter includes a parameter indicating polarization multiplexing (PM) with one of the following: quadrature phase shift keying (QPSK), 8 phase shift keying (8PSK), 8 quadrature amplitude modulation (8QAM), 16QAM, 32QAM, 64QAM, 128QAM, time-domain hybrid QPSK/8QAM, time-domain hybrid 8QAM/16QAM, and time-domain hybrid 32QAM/64QAM.

In one embodiment, the FEC coding overhead percent parameter includes a parameter indicating one of the following FEC coding overheads: substantially 7%, substantially 13%, substantially 20%, and substantially 25%.

In one embodiment, the parameter of a central wavelength of a channel wavelength includes a parameter indicating one of the following central wavelengths: a wavelength in the International Telecommunication Union (ITU) transmission C-Band, and a wavelength in the ITU transmission L-Band.

In one embodiment, the client port rate parameter includes a parameter indicating one of the following bit rates: substantially 100 Gigabit per second (Gb/s), substantially 200 Gb/s, substantially 400 Gb/s, substantially 1 Terabit per second (Tb/s), substantially 1600 Gb/s, and a variable bit rate.

In some embodiments, the M−L protection DSP-enabled optical transceivers/transponders correspond to M−L of the N working DSP-enabled optical transceivers/transponders.

In some embodiments, each of the at least one working DSP-enabled optical transceiver/transponder that uses the first set of transmission parameters includes one of the following: a DSP-enabled optical transceiver/transponder that uses a set of fixed transmission parameters corresponding to the first set of transmission parameters, a DSP-enabled optical transceiver/transponder having a capability of using a set of adjustable transmission parameters of one of the L protection DSP-enabled optical transceivers/transponders and configured to use the first set of transmission parameters, and a DSP-enabled optical transceiver/transponder having a capability of using a set of adjustable transmission parameters which does not enable it to protect every one of the N working DSP-enabled optical transceivers/transponders and is configured to use the first set of transmission parameters, and each of the at least one working DSP-enabled optical transceiver/transponder that uses the second set of transmission parameters includes one of the following: a DSP-enabled optical transceiver/transponder that uses a set of fixed transmission parameters corresponding to the second set of transmission parameters, a DSP-enabled optical transceiver/transponder having a capability of using a set of adjustable transmission parameters of one of the L protection DSP-enabled optical transceivers/transponders and configured to use the second set of transmission parameters, and a DSP-enabled optical transceiver/transponder having a capability of using a set of adjustable transmission parameters which does not enable it to protect every one of the N working DSP-enabled optical transceivers/transponders and is configured to use the second set of transmission parameters.

In one embodiment, the at least one working DSP-enabled optical transceiver/transponder that uses the first set of transmission parameters includes a substantially 100 Gb/s DSP-enabled optical transceiver/transponder.

In some embodiments, the apparatus is within a network element (NE) of the optical network. In other embodiments, the apparatus is external to and operatively associated with an NE of the optical network.

There is also provided in accordance with a further embodiment of the present invention a method of enabling an M:N recovery scheme in an optical network, wherein M and N are positive integers and $1 \leq M < N$, the method including allocating a set of M protection DSP-enabled optical transceivers/transponders for protecting a set of N working DSP-enabled optical transceivers/transponders which includes at least one working DSP-enabled optical transceiver/transponder that uses a first set of transmission parameters and at least one working DSP-enabled optical transceiver/transponder that uses a second set of transmission parameters which is different from the first set of transmission parameters, wherein the set of M protection DSP-enabled optical transceivers/transponders includes L protection DSP-enabled optical transceivers/transponders, each having a capability of using a set of adjustable transmission parameters enabling it to protect every one of the N working DSP-enabled optical transceivers/transponders, and, when M>L, M−L protection DSP-enabled optical transceivers/transponders, each having a capability of protecting at least one, but not all, of the N working DSP-enabled optical transceivers/transponders, wherein L is a positive integer and $1 \leq L \leq M$.

In some embodiments, the allocating includes allocating the set of M protection DSP-enabled optical transceivers/transponders via a control plane of the optical network.

In some embodiments, the allocating includes allocating the set of M protection DSP-enabled optical transceivers/transponders in response to a determination that the set of N working DSP-enabled optical transceivers/transponders includes working DSP-enabled optical transceivers/transponders that use different sets of transmission parameters.

In some embodiments, the method further includes allocating the set of N working DSP-enabled optical transceivers/transponders prior to allocating the set of M protection DSP-enabled optical transceivers/transponders, wherein the allocating the set of M protection DSP-enabled optical transceivers/transponders includes allocating the set of M protection DSP-enabled optical transceivers/transponders in response to allocation of the set of N working DSP-enabled optical transceivers/transponders.

There is also provided in accordance with another embodiment of the present invention a method of using a first DSP-enabled optical transceiver/transponder having a capability of using adjustable transmission parameters in an optical network, the method including using the first DSP-enabled optical transceiver/transponder in a protection mode of operation as a protection DSP-enabled optical transceiver/transponder to protect one of a plurality of working DSP-enabled optical transceivers/transponders, and using the first DSP-enabled optical transceiver/transponder in an association mode of operation together with a second DSP-enabled optical transceiver/transponder having a capability of using adjustable transmission parameters to jointly overcome a change in at least one transmission parameter over a working path associated with the second DSP-enabled optical transceiver/transponder.

In some embodiments, the method further includes determining an operation mode of the first DSP-enabled optical transceiver/transponder as one of the protection mode of operation and the association mode of operation prior to the using, and the using includes using the first DSP-enabled optical transceiver/transponder in the determined one of the protection mode of operation and the association mode of operation.

In further embodiments, the determining includes determining the operation mode of the first DSP-enabled optical transceiver/transponder via a control plane of the optical network.

In some embodiments, the using the first DSP-enabled optical transceiver/transponder in the protection mode of operation includes detecting a failure in the one of a plurality of working DSP-enabled optical transceivers/transponders, configuring adjustable transmission parameters of the first DSP-enabled optical transceiver/transponder to correspond to transmission parameters of the one of a plurality of working DSP-enabled optical transceivers/transponders, and using the first DSP-enabled optical transceiver/transponder for communication instead of the one of a plurality of working DSP-enabled optical transceivers/transponders.

In some embodiments, the using the first DSP-enabled optical transceiver/transponder in the association mode of operation includes configuring adjustable transmission parameters of the first and second DSP-enabled optical transceivers/transponders to enable the first and second DSP-enabled optical transceivers/transponders to jointly overcome the change in at least one transmission parameter over the working path associated with the second DSP-enabled optical transceiver/transponder, and using the first DSP-enabled optical transceiver/transponder together with the second DSP-enabled optical transceiver/transponder for communication over a link including the working path associated with the second DSP-enabled optical transceiver/transponder and an additional working path associated with the first DSP-enabled optical transceiver/transponder.

BRIEF DESCRIPTION OF THE DRAWINGS

The present invention will be understood and appreciated more fully from the following detailed description, taken in conjunction with the drawings in which:

FIG. 5 is a simplified flowchart illustration of a method of enabling an M:N recovery scheme in an optical network of the type of the optical network of FIG. 4, in accordance with an embodiment of the present invention;

DETAILED DESCRIPTION OF EMBODIMENTS

Figure 1:
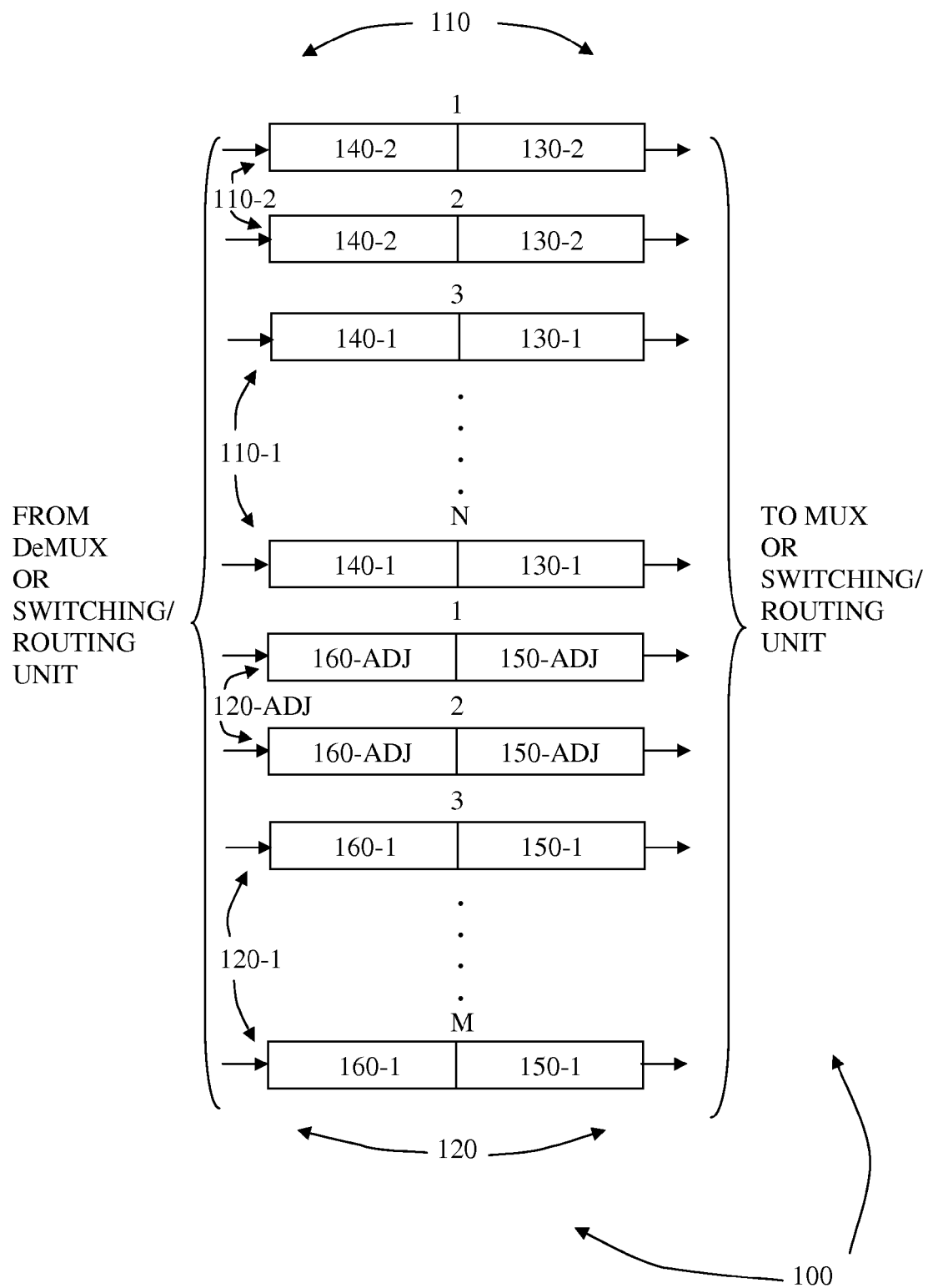
FIG. 1 is a simplified block diagram illustration of apparatus for enabling an M:N recovery scheme, the apparatus being constructed and operative in accordance with an embodiment of the present invention.

Reference is now made to FIG. 1, which is a simplified block diagram illustration of apparatus for enabling an M:N recovery scheme, the apparatus being constructed and operative in accordance with an embodiment of the present invention.

The apparatus of FIG. 1, which is generally designated 100, includes a set of N working digital signal processing (DSP)-enabled optical transceivers/transponders 110 and a set of M protection DSP-enabled optical transceivers/transponders 120, wherein M and N are positive integers and 1≤M<N. The set of M protection optical transceivers/transponders 120 is operable to protect the set of N working optical transceivers/transponders 110.

In the context of recovery schemes a separation is sometimes made, for example in the above-mentioned article entitled "IETF Work on Protection and Restoration for Optical Networks" of David W. Griffith, between a 1:N recovery scheme and an M:N recovery scheme in which M>1. However, throughout the present specification and claims the term "M:N recovery scheme" is referred to as covering both a 1:N recovery scheme and an M:N recovery scheme with M>1.

Each working optical transceiver/transponder 110 includes a working optical transmitter 130 and a working optical receiver 140. Each protection optical transceiver/transponder 120 includes a protection optical transmitter 150 and a protection optical receiver 160.

By way of a non-limiting example, in FIG. 1 the apparatus 100 is depicted in an architecture in which each optical transmitter 130 and paired optical receiver 140 of each working optical transceiver/transponder 110 are arranged in a back-to-back arrangement, and similarly each optical transmitter 150 and paired optical receiver 160 of each protection optical transceiver/transponder 120 are arranged in a back-to-back arrangement. It is, however, appreciated that the apparatus 100 may be arranged in any other suitable architecture, such as, by way of a non-limiting example, an alternative architecture (not shown) in which the optical transmitters 130 and 150 are grouped together in one group and the optical receivers 140 and 160 are grouped together in another group, and the group of the optical transmitters 130 and 150 is separate from the group of the optical receivers 140 and 160. In such alternative architecture, the group of the optical transmitters 130 and 150 may, for example, be arranged as an array of tightly packaged optical transmitters, and the group of the optical receivers 140 and 160 may, for example, be arranged as an array of tightly packaged optical receivers.

The optical transmitters 130 and 150 are operable to transmit optical signals to a multiplexer (MUX) or a switching/routing unit (both not shown), and the optical receivers 140 and 160 are operable to receive optical signals from a demultiplexer (DeMUX) (not shown) or the switching/routing unit. By way of a non-limiting example, the MUX may be combined with the optical transmitters 130 and 150 in one or more units (not shown) which may form part of or be associated with an optical network, such as an optical network as described below with reference to FIG. 4, and the DeMUX may be combined with the optical receivers 140 and 160 in one or more units (not shown) which may also form part of or be associated with the optical network. The switching/routing unit may also typically form part of the optical network and be comprised in a network element (not shown) in the optical network.

In accordance with an embodiment of the present invention the set of N working DSP-enabled optical transceivers/transponders 110 includes at least one working DSP-enabled optical transceiver/transponder 110 that uses a first set of transmission parameters and at least one working DSP-enabled optical transceiver/transponder 110 that uses a second set of transmission parameters which is different from the first set of transmission parameters, and the set of M protection DSP-enabled optical transceivers/transponders 120 includes L protection DSP-enabled optical transceivers/transponders 120, each having a capability of using a set of adjustable transmission parameters enabling it to protect every one of the N working DSP-enabled optical transceivers/transponders 110, and, when M>L, M−L protection DSP-enabled optical transceivers/transponders 120, each having a capability of protecting at least one, but not all, of the N working DSP-enabled optical transceivers/transponders 110, wherein L is a positive integer and $1 \leq L \leq M$.

In some embodiments, the M−L protection DSP-enabled optical transceivers/transponders 120 correspond to M−L of the N working DSP-enabled optical transceivers/transponders 110.

Each of the L protection DSP-enabled optical transceivers/transponders 120 may, for example, include a DSP-enabled optical transceiver/transponder with an optical transmitter as described below with reference to FIG. 2 and an optical receiver as described below with reference to FIG. 3, or a less-encompassing DSP-enabled optical transceiver/transponder with a less-encompassing DSP-enabled optical transmitter and a less-encompassing DSP-enabled optical receiver as described below.

Each of the at least one working DSP-enabled optical transceiver/transponder 110 that uses the first set of transmission parameters may include one of the following: a DSP-enabled optical transceiver/transponder that uses a set of fixed transmission parameters corresponding to the first set of transmission parameters; a DSP-enabled optical transceiver/transponder having a capability of using a set of adjustable transmission parameters of one of the L protection DSP-enabled optical transceivers/transponders 120 and configured to use the first set of transmission parameters; and a DSP-enabled optical transceiver/transponder having a capability of using a set of adjustable transmission parameters which does not enable it to protect every one of the N working DSP-enabled optical transceivers/transponders 110 and is configured to use the first set of transmission parameters. Each of the at least one working DSP-enabled optical transceiver/transponder 110 that uses the second set of transmission parameters may include one of the following: a DSP-enabled optical transceiver/transponder that uses a set of fixed transmission parameters corresponding to the second set of transmission parameters; a DSP-enabled optical transceiver/transponder having a capability of using a set of adjustable transmission parameters of one of the L protection DSP-enabled optical transceivers/transponders 120 and configured to use the second set of transmission parameters; and a DSP-enabled optical transceiver/transponder having a capability of using a set of adjustable transmission parameters which does not enable it to protect every one of the N working DSP-enabled optical transceivers/transponders 110 and is configured to use the second set of transmission parameters.

Each DSP-enabled optical transceiver/transponder that uses a set of fixed transmission parameters, irrespective of whether the set of fixed transmission parameters corresponds to the first set of transmission parameters or to the second set of transmission parameters, may be a conventional DSP-enabled universal polarization-multiplexed quadrature amplitude modulation (QAM) optical transceiver/transponder that uses coherent detection. Such a conventional DSP-enabled universal optical transceiver/transponder may, for example, include DSP-enabled universal polarization-multiplexed QAM transmitter and receiver as described and shown in the above-mentioned article entitled "Rate-Adaptable Optics for Next Generation Long-Haul Transport Networks" of Xiang Zhou, Lynn E. Nelson, and Peter Magill.

Figure 2:
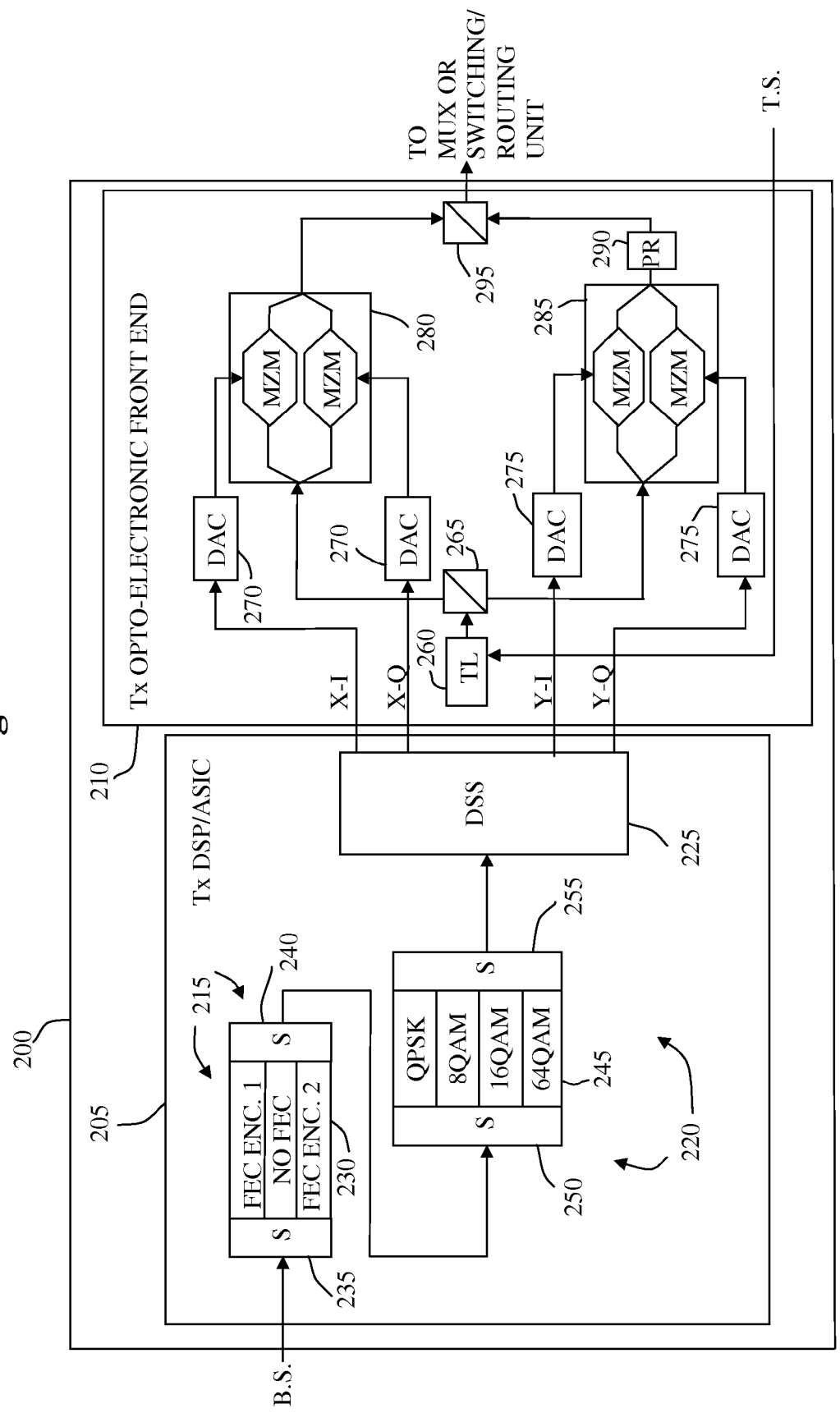
FIG. 2 is a simplified block diagram illustration of a DSP-enabled optical transmitter in the apparatus of FIG. 1, the DSP-enabled optical transmitter having a capability of using a set of adjustable transmission parameters.
Figure 3:
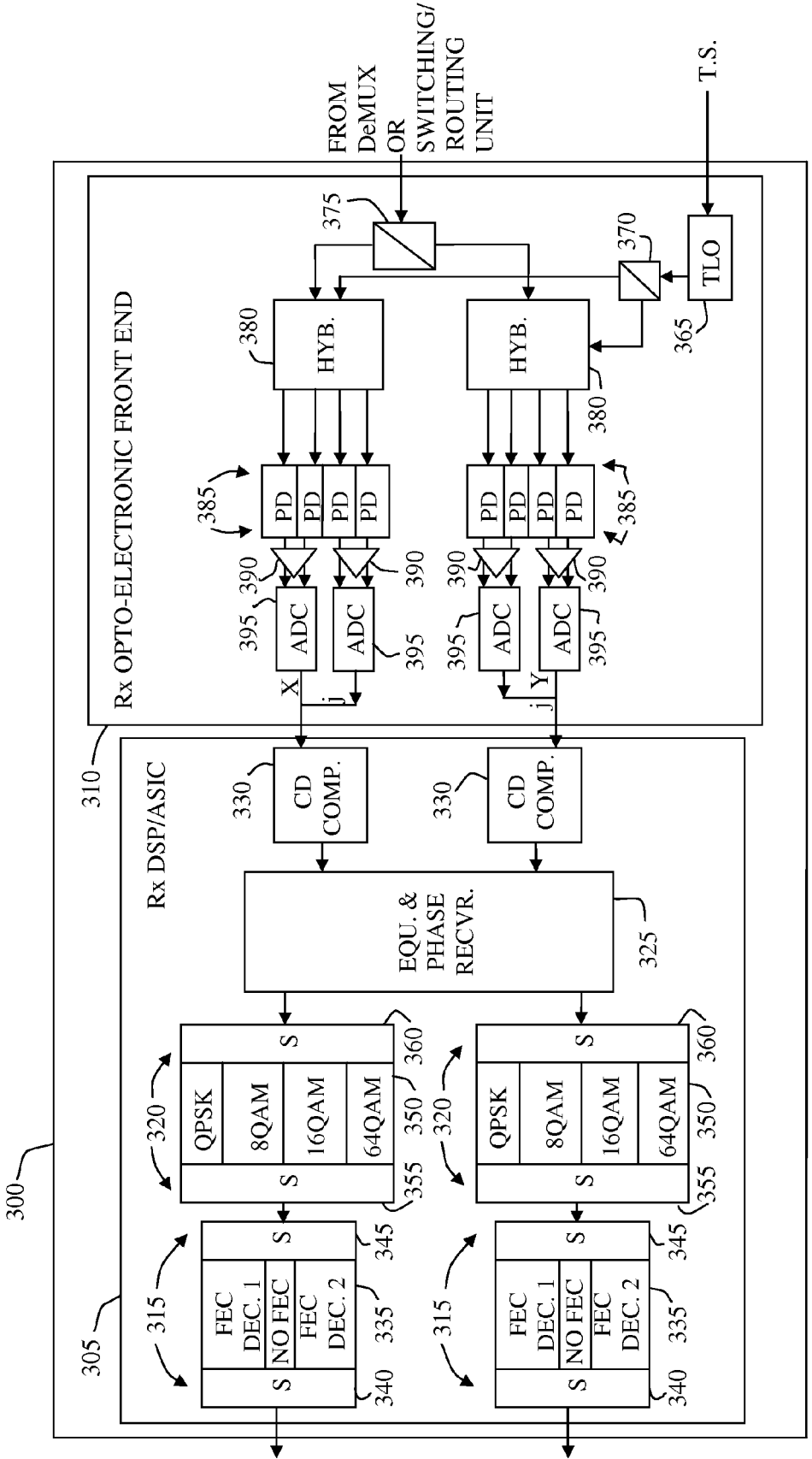
FIG. 3 is a simplified block diagram illustration of a DSP-enabled optical receiver that uses coherent detection, the DSP-enabled optical receiver being comprised in the apparatus of FIG. 1 and having a capability of using a set of adjustable transmission parameters.

Each DSP-enabled optical transceiver/transponder having a capability of using a set of adjustable transmission parameters of one of the L protection DSP-enabled optical transceivers/transponders 120, irrespective of whether it is configured to use the first set of transmission parameters, the second set of transmission parameters, or any other set of transmission parameters within adjustability ranges/values covered by the set of adjustable transmission parameters of the one of the L protection DSP-enabled optical transceivers/transponders 120, may be similar in structure and functionality to the one of the L protection DSP-enabled optical transceivers/transponders 120 and may similarly include an optical transmitter as described below with reference to FIG. 2 and an optical receiver as described below with reference to FIG. 3, or a less-encompassing DSP-enabled optical transmitter and a less-encompassing DSP-enabled optical receiver as described below.

Each DSP-enabled optical transceiver/transponder having a capability of using a set of adjustable transmission parameters which does not enable it to protect every one of the N working DSP-enabled optical transceivers/transponders 110, irrespective of whether it is configured to use the first set of transmission parameters or the second set of transmission parameters, may include a less-adjustable version of the optical transmitter of FIG. 2 and a less-adjustable version of the optical receiver of FIG. 3 as described below.

In one embodiment, the at least one working DSP-enabled optical transceiver/transponder 110 that uses the first set of transmission parameters includes a substantially 100 Gigabit per second (Gb/s) DSP-enabled optical transceiver/transponder.

In some embodiments, the transmission parameters of each of the first set of transmission parameters, the second set of transmission parameters, and each of the sets of adjustable transmission parameters usable by the L protection DSP-enabled optical transceivers/transponders 120 include at least one of the following: a modulation scheme parameter; a forward error correction (FEC) coding overhead percent parameter; a symbol rate parameter; a parameter of a central wavelength of a channel wavelength; and a client port rate parameter.

In one embodiment, the modulation scheme parameter includes a parameter indicating polarization multiplexing (PM) with one of the following: quadrature phase shift keying (QPSK); 8 phase shift keying (8PSK); 8QAM; 16QAM; 32QAM; 64QAM; 128QAM; time-domain hybrid QPSK/8QAM; time-domain hybrid 8QAM/16QAM; and time-domain hybrid 32QAM/64QAM.

In one embodiment, the FEC coding overhead percent parameter includes a parameter indicating one of the following FEC coding overheads: substantially 7%; substantially 13%; substantially 20%; and substantially 25%.

Throughout the present specification and claims, the term "substantially", when used in conjunction with a specified percentage value, refers to the specified percentage value or to approximately the specified percentage value. For example, the term "substantially 7%" refers to 7% or approximately 7%.

In one embodiment, the parameter of a central wavelength of a channel wavelength includes a parameter indicating one of the following central wavelengths: a wavelength in the International Telecommunication Union (ITU) transmission C-Band; and a wavelength in the ITU transmission L-Band.

In one embodiment, the client port rate parameter includes a parameter indicating one of the following bit rates: substantially 100 Gb/s; substantially 200 Gb/s; substantially 400 Gb/s; substantially 1 Terabit per second (Tb/s); substantially 1600 Gb/s; and a variable bit rate.

Throughout the present specification and claims, the term "substantially", when used in conjunction with a specified bit-rate, refers to the specified bit rate or to approximately the specified bit rate. Thus, the term "substantially 100 Gb/s" refers to a bit rate of 100 Gb/s or approximately 100 Gb/s, the term "substantially 400 Gb/s" refers to a bit rate of 400 Gb/s or approximately 400 Gb/s, the term "substantially 1000 Gb/s" or "substantially 1 Tb/s" refers to a bit rate of 1000 Gb/s (1 Tb/s) or approximately 1 Tb/s, and so forth. For example, which is not meant to be limiting, the bit rate of substantially 100 Gb/s may be 103.125 Gb/s (due to 66 B/64 B block coding) or 112 Gb/s (due to both 66 B/64 B coding and standard FEC), which are both greater than 100 Gb/s. Further for example, which is not meant to be limiting, the bit rate of substantially 400 Gb/s may be four times the bit rate of substantially 100 Gb/s, and in a case where the bit rate of substantially 100 Gb/s is greater than 100 Gb/s the bit rate of substantially 400 Gb/s is greater than 400 Gb/s.

Non-limiting examples of symbol rates that may be indicated by the symbol rate parameter include symbol rates between 10 and 100 Giga-Baud (GBaud).

The first and second sets of transmission parameters may differ in values of one or more of the parameters and/or in indications indicated by one or more of the parameters and/or in number of the parameters. A non-limiting example of a value difference between the first set of transmission parameters and the second set of transmission parameters is when the symbol rate in the first set of transmission parameters is different from the symbol rate in the second set of transmission parameters. A non-limiting example of an indication difference between the first set of transmission parameters and the second set of transmission parameters is when the modulation scheme parameter in the first set of transmission parameters indicates a selection of 8PSK and the modulation scheme parameter in the second set of transmission parameters indicates a selection of hybrid QPSK/8QAM. A non-limiting example of a difference in number of the parameters is when the at least one working DSP-enabled optical transceiver/transponder 110 that uses the first set of transmission parameters does not use FEC whereas the at least one working DSP-enabled optical transceiver/transponder 110 that uses the second set of transmission parameters uses FEC, and hence the second set of transmission parameters includes the FEC coding overhead percent parameter whereas the first set of transmission parameters does not include the FEC coding overhead percent parameter.

It is appreciated that enablement of each of the L protection DSP-enabled optical transceivers/transponders 120 to protect every one of the N working DSP-enabled optical transceivers/transponders 110 is typically obtained when all sets of transmission parameters actually used by the N working DSP-enabled optical transceivers/transponders 110 are within adjustability ranges/values covered by each set of adjustable transmission parameters of each of the L protection DSP-enabled optical transceivers/transponders 120. For example, which is not meant to be limiting, if the N working DSP-enabled optical transceivers/transponders 110 use sets of transmission parameters which, in total, only differ in two parameters, one being, for example, the modulation scheme parameter and the other being the parameter of a central wavelength of a channel wavelength, and the modulation scheme parameter can take one of two indicated selections, for example QPSK and 16QAM, and the parameter of a central wavelength of a channel wavelength can take different central wavelengths of channel wavelengths in the ITU transmission C-Band, then each of the L protection DSP-enabled optical transceivers/transponders 120 is enabled to protect every one of the N working DSP-enabled optical transceivers/transponders 110, for example, when each set of adjustable transmission parameters usable by each of the L protection DSP-enabled optical transceivers/transponders 120 uses the transmission parameters that are common to all the sets of transmission parameters of the N working DSP-enabled optical transceivers/transponders 110 and also covers a possibility of selecting any one modulation scheme of a plurality of modulation schemes which include at least QPSK and 16QAM and a possibility of selecting any one central wavelength of a channel wavelength within the entire ITU transmission C-Band.

In one embodiment, the adjustability ranges/values of some or all of the sets of adjustable transmission parameters usable by the L protection DSP-enabled optical transceivers/transponders 120 may be identical.

In another embodiment, the adjustability ranges/values of some or all of the sets of adjustable transmission parameters usable by the L protection DSP-enabled optical transceivers/transponders 120 may be different. For example, in the above-mentioned example in which each set of adjustable transmission parameters usable by each of the L protection DSP-enabled optical transceivers/transponders 120 covers a possibility of selecting any one modulation scheme of a plurality of modulation schemes which include at least QPSK and 16QAM, the plurality of modulation schemes may include for some sets of adjustable transmission parameters usable by the L protection DSP-enabled optical transceivers/transponders 120 two additional modulation schemes and for other sets of adjustable transmission parameters usable by the L protection DSP-enabled optical transceivers/transponders 120 three additional modulation schemes. It is appreciated that such adjustability difference does not affect the enablement of each of the L protection DSP-enabled optical transceivers/transponders 120 to protect every one of the N working DSP-enabled optical transceivers/transponders 110.

The set of N working DSP-enabled optical transceivers/transponders 110 may also include one or more DSP-enabled optical transceivers/transponders 110 that use sets of transmission parameters other than the first and second sets of transmission parameters, wherein such other sets of transmission parameters are within adjustability ranges/values covered by the sets of adjustable transmission parameters of the L protection optical transceivers/transponders 120, and each of the L protection optical transceivers/transponders 120 may also be used to protect every one of the DSP-enabled optical transceivers/transponders 110 that uses such other sets of transmission parameters. For example, which is not meant to be limiting, the set of N working DSP-enabled optical transceivers/transponders 110 may also include one DSP-enabled optical transceiver/transponder 110 that uses a third set of transmission parameters that is within adjustability ranges/values covered by the sets of adjustable transmission parameters of the L protection optical transceivers/transponders 120, and each of the L protection optical transceivers/transponders 120 may also be used to protect the one DSP-enabled optical transceiver/transponder 110 that uses the third set of transmission parameters.

In operation, in accordance with an embodiment of the present invention, the set of M protection DSP-enabled optical transceivers/transponders 120 is allocated for protecting the set of N working DSP-enabled optical transceivers/transponders 110. Allocation of the set of M protection DSP-enabled optical transceivers/transponders 120 may be performed when it is determined that the set of N working DSP-enabled optical transceivers/transponders 110 includes working DSP-enabled optical transceivers/transponders 110 that use different sets of transmission parameters, or upon installation or allocation of the entire set of N working DSP-enabled optical transceivers/transponders 110, or upon installation or allocation of working DSP-enabled optical transceivers/transponders 110 that use different sets of transmission parameters. It is appreciated that a determination that the set of N working DSP-enabled optical transceivers/transponders 110 includes working DSP-enabled optical transceivers/transponders 110 that use different sets of transmission parameters, allocation of the set of M protection DSP-enabled optical transceivers/transponders 120 and the set of N working DSP-enabled optical transceivers/transponders 110, and a determination of which of the M protection DSP-enabled optical transceivers/transponders 120 to use for protecting a failed working DSP-enabled optical transceiver/transponder 110 may, for example, be performed by a network management system (not shown) which may be comprised in or associated with the optical network or by a network element (not shown) in the optical network.

In one embodiment, the set of N working DSP-enabled optical transceivers/transponders 110 is allocated prior to allocating the set of M protection DSP-enabled optical transceivers/transponders 120 and allocation of the set of M protection DSP-enabled optical transceivers/transponders 120 is performed in response to allocation of the set of N working DSP-enabled optical transceivers/transponders 110.

In one embodiment, the set of M protection DSP-enabled optical transceivers/transponders 120 is allocated via a control plane (not shown) of the optical network.

The allocation of the set of M protection DSP-enabled optical transceivers/transponders 120 for protecting the set of N working DSP-enabled optical transceivers/transponders 110 enables an M:N recovery scheme in which M of the N working DSP-enabled optical transceivers/transponders 110 may be simultaneously protected by the M protection DSP-enabled optical transceivers/transponders 120, or less than M of the N working DSP-enabled optical transceivers/transponders 110 may be simultaneously protected by a respective number of protection DSP-enabled optical transceivers/transponders 120. In a case where M=1, that is the M:N recovery scheme is a 1:N recovery scheme, the set of M protection DSP-enabled optical transceivers/transponders 120 reduces to a single protection DSP-enabled optical transceiver/transponder 120 having a capability of using a set of adjustable transmission parameters enabling it to protect every one of the N working DSP-enabled optical transceivers/transponders 110.

When a failure is detected in any one working DSP-enabled optical transceiver/transponder 110, such as one working optical transceiver/transponder 110 that uses the first set of transmission parameters or one working optical transceiver/transponder 110 that uses the second set of transmission parameters, one of the M protection DSP-enabled optical transceivers/transponders 120 is allocated for protecting the failed working DSP-enabled optical transceiver/transponder 110. The failure may, for example, be detected by the network management system or by the network element, and the one of the M protection DSP-enabled optical transceivers/transponders 120 may be allocated by the network management system or by the network element, for example, via the control plane.

A selection of the one of the M protection DSP-enabled optical transceivers/transponders 120 to be allocated for protecting the failed working DSP-enabled optical transceiver/transponder 110 may be performed according to various criteria, typically including an availability criterion which seeks to select a suitable one of the M protection DSP-enabled optical transceivers/transponders 120 from those of the M protection DSP-enabled optical transceivers/transponders 120 that are not already used for protecting other working DSP-enabled optical transceivers/transponders 110. The selected and allocated protection DSP-enabled optical transceiver/transponder 120 may be one of the L protection DSP-enabled optical transceivers/transponders 120, or, only in a case where M>L, either one of the L protection DSP-enabled optical transceivers/transponders 120 or one of the M-L protection DSP-enabled optical transceivers/transponders 120.

When the selected and allocated protection DSP-enabled optical transceiver/transponder 120 is one of the L protection DSP-enabled optical transceivers/transponders 120, the adjustable transmission parameters of the allocated one of the L protection DSP-enabled optical transceivers/transponders 120 are configured, automatically or in response to an instruction or an input by a network operator (not shown), to correspond to transmission parameters of the failed working DSP-enabled optical transceiver/transponder 110. Thus, if, for example, the failed working DSP-enabled optical transceiver/transponder 110 is a working optical transceiver/transponder 110 that uses the first set of transmission parameters, the adjustable transmission parameters of the allocated one of the L protection DSP-enabled optical transceivers/transponders 120 are configured to correspond to the first set of transmission parameters, and if, for example, the failed working DSP-enabled optical transceiver/transponder 110 is a working optical transceiver/transponder 110 that uses the second set of transmission parameters, the adjustable transmission parameters of the allocated one of the L protection DSP-enabled optical transceivers/transponders 120 are configured to correspond to the second set of transmission parameters.

After the adjustable transmission parameters of the allocated one of the L protection DSP-enabled optical transceivers/transponders 120 are configured to correspond to the transmission parameters of the failed working DSP-enabled optical transceiver/transponder 110, the allocated one of the L protection DSP-enabled optical transceivers/transponders 120 is used for communication instead of the failed working DSP-enabled optical transceiver/transponder 110.

In the case where M>L and the selected and allocated protection DSP-enabled optical transceiver/transponder 120 is not one of the L protection DSP-enabled optical transceivers/transponders 120, a determination is made which of the M−L protection DSP-enabled optical transceivers/transponders 120 is to be selected and allocated. If the failed working DSP-enabled optical transceiver/transponder 110 corresponds to an available one of the M−L protection DSP-enabled optical transceivers/transponders 120, the corresponding available one of the M−L protection DSP-enabled optical transceivers/transponders 120 may be selected and allocated and then used for communication instead of the failed working DSP-enabled optical transceiver/transponder 110. Thus, for example, if the failed working DSP-enabled optical transceiver/transponder 110 is a working optical transceiver/transponder 110 that uses the first set of transmission parameters and the M−L protection DSP-enabled optical transceivers/transponders 120 include an available protection DSP-enabled optical transceiver/transponder that uses a set of fixed transmission parameters corresponding to the first set of transmission parameters, the available protection DSP-enabled optical transceiver/transponder that uses the set of fixed transmission parameters corresponding to the first set of transmission parameters may be selected and allocated and then used for communication instead of the failed working DSP-enabled optical transceiver/transponder 110.

If the failed working DSP-enabled optical transceiver/transponder 110 does not correspond to one of the M−L protection DSP-enabled optical transceivers/transponders 120, another one of the M−L protection DSP-enabled optical transceivers/transponders 120, such as an available DSP-enabled optical transceiver/transponder having a capability of using a set of adjustable transmission parameters which enables it to protect the failed working DSP-enabled optical transceiver/transponder 110 but does not enable it to protect every other one of the N working DSP-enabled optical transceivers/transponders 110, may be selected and allocated. The set of adjustable transmission parameters of the allocated protection DSP-enabled optical transceiver/transponder 120 is then configured to correspond to the transmission parameters of the failed working DSP-enabled optical transceiver/transponder 110, and the allocated protection DSP-enabled optical transceiver/transponder 120 is then used for communication instead of the failed working DSP-enabled optical transceiver/transponder 110.

Operations similar to those mentioned above in connection with and after detection of a failure in one working DSP-enabled optical transceiver/transponder 110 may be performed when failures are detected in additional (up to M−1) working optical transceivers/transponders 110 to result in using additional (up to M−1) protection optical transceivers/transponders 120 instead of the additional working optical transceivers/transponders 110, respectively.

Without limiting the generality of the foregoing, FIG. 1 depicts a non-limiting example in which: (1) M is much greater than one and N is greater than M; (2) each of the N working DSP-enabled optical transceivers/transponders 110 is a DSP-enabled optical transceiver/transponder that uses a set of fixed transmission parameters; (3) two of the N working optical transceivers/transponders 110 are optical transceivers/transponders that use the second set of transmission parameters and are also referred to using a sub-designation "2", that is, each such working DSP-enabled optical transceiver/transponder 110 is designated "110-2", and the optical transmitter 130 and optical receiver 140 thereof are designated "130-2" and "140-2", respectively; (4) the other N−2 working optical transceivers/transponders 110 are optical transceivers/transponders that use the first set of transmission parameters and are also referred to using a sub-designation "1", that is, each such working DSP-enabled optical transceiver/transponder 110 is designated "110-1", and the optical transmitter 130 and optical receiver 140 thereof are designated "130-1" and "140-1", respectively; (5) L=2 and the L protection DSP-enabled optical transceivers/transponders 120 are also referred to using a sub-designation "ADJ", that is, each such protection DSP-enabled optical transceiver/transponder 120 is designated "120-ADJ", and the optical transmitter 150 and optical receiver 160 thereof are designated "150-ADJ" and "160-ADJ", respectively; and (6) the M−2 protection DSP-enabled optical transceivers/transponders 120 correspond to and may be used to protect M−2 of the N working DSP-enabled optical transceivers/transponders 110-1 and are also referred to using the sub-designation "1", that is, each such protection DSP-enabled optical transceiver/transponder 120 is designated "120-1", and the optical transmitter 150 and optical receiver 160 thereof are designated "150-1" and "160-1", respectively.

In the example of FIG. 1 the M protection optical transceivers/transponders 120 may protect and replace any combination of up to M working optical transceivers/transponders 110 because up to M−2 of the M protection optical transceivers/transponders 120-1 may protect and replace up to M−2 of the working optical transceivers/transponders 110-1 and the two protection optical transceivers/transponders 120-ADJ may protect and replace any one of the following combinations of working optical transceivers/transponders: a combination including any two working optical transceivers/transponders 110-1; a combination including the two working optical transceivers/transponders 110-2; and a combination including one working optical transceiver/transponder 110-1 and one of the two working optical transceivers/transponders 110-2.

Reference is now additionally made to FIG. 2, which is a simplified block diagram illustration of a DSP-enabled optical transmitter 200 in the apparatus 100 of FIG. 1, the DSP-enabled optical transmitter 200 having a capability of using a set of adjustable transmission parameters.

The DSP-enabled optical transmitter 200 may form the optical transmitter part of every one of the following in the apparatus 100: every one of the L protection DSP-enabled optical transceivers/transponders 120; and every one working DSP-enabled optical transceiver/transponder 110 having a capability of using the set of adjustable transmission parameters of any one of the L protection DSP-enabled optical transceivers/transponders 120, irrespective of any specific set of transmission parameters, such as the first set of transmission parameters or the second set of transmission parameters, which it is configured to use. In the non-limiting example of FIG. 1, each optical transmitter 150-ADJ may be implemented by one DSP-enabled optical transmitter 200.

The DSP-enabled optical transmitter 200 includes a transmitter DSP/ASIC (Tx DSP/ASIC) 205 and a transmitter (Tx) opto-electronic front end 210. The DSP-enabled optical transmitter 200 is operative to convert a binary signal (B.S.), fed into the Tx DSP/ASIC 205, into an optical signal and to transmit the optical signal to the MUX or the switching/routing unit mentioned above with reference to FIG. 1.

The Tx DSP/ASIC 205 includes a FEC encoding unit 215, a mapping unit 220, and a digital spectral shaping (DSS) unit 225. The FEC encoding unit 215 includes a module 230 which includes a plurality of FEC encoders, and switches/selectors 235 and 240 which enable selection of one of the plurality of FEC encoders. The module 230 may also include an optional NO FEC route, a selection of which by the switches/selectors 235 and 240 skips performance of FEC encoding. Alternatively, the module 230 may be bypassed via a route external to the FEC encoding unit 215 for skipping FEC encoding. By way of a non-limiting example, the module 230 in FIG. 2 includes two FEC encoders referred to as FEC ENC. 1 and FEC ENC. 2, and the NO FEC route. It is, however, appreciated that the module 230 may include other FEC encoders and/or more than two FEC encoders.

The mapping unit 220 includes a module 245 which includes a plurality of QAM mappers, and switches/selectors 250 and 255 which enable selection of one of the plurality of QAM mappers. By way of a non-limiting example, the module 245 in FIG. 2 includes QPSK, 8QAM, 16QAM and 64QAM mappers. It is, however, appreciated that the module 245 may include other mappers and/or more than four mappers.

The Tx opto-electronic front end 210 includes a tunable laser (TL) 260, a beam splitter 265, two digital-to-analog converters (DACs) 270 for X-polarization inphase (I) and quadrature (Q) signal components, two DACs 275 for Y-polarization I and Q signal components, a quadrature modulator 280 for the X-polarization signal components and a quadrature modulator 285 for the Y-polarization signal components, a 90° polarization rotator (PR) 290 associated with the quadrature modulator 285, and a polarization beam combiner (PBC) 295.

The TL 260 is operative to emit a continuous wave (CW) laser beam towards the beam splitter 265. The beam splitter 265 is operative to split a received CW laser beam into two beams and to provide one of the two beams to the quadrature modulator 280 and the other beam to the quadrature modulator 285.

Each of the quadrature modulators 280 and 285 typically includes two nested Mach-Zehnder modulators (MZMs) with their ends coupled. Each of the DACs 270 is operatively associated with the DSS 225 of the Tx DSP/ASIC 205 and with the quadrature modulator 280, and each of the DACs 275 is operatively associated with the DSS 225 and with the quadrature modulator 285. The MZMs in the quadrature modulator 280 are driven by the DACs 270 so as to enable the quadrature modulator 280 to perform quadrature modulation of signals provided thereto, and the MZMs in the quadrature modulator 285 are driven by the DACs 275 so as to enable the quadrature modulator 285 to perform quadrature modulation of signals provided thereto. The PR 290 and the PBC 295 together form a polarization multiplexer which is operative to perform polarization multiplexing of signals provided thereto from the quadrature modulators 280 and 285.

In operation, a binary signal that is fed into the Tx DSP/ASIC 205 either bypasses the FEC encoding unit 215 or undergoes FEC encoding in the FEC encoding unit 215 according to a FEC coding selection. The FEC-coded binary signal outputted from the FEC encoding unit 215, or the binary signal bypassing the FEC encoding unit 215, is fed into the mapping unit 220 where it is mapped into a selected QAM mapping to produce a mapped signal. The mapped signal then undergoes digital spectral shaping in the DSS 225, which outputs I and Q signal components for X-polarization (X-I and X-Q components) to the DACs 270 for driving the MZMs included in the quadrature modulator 280 and I and Q signal components for Y-polarization (Y-I and Y-Q components) to the DACs 275 for driving the MZMs included in the quadrature modulator 285.

The quadrature modulators 280 and 285 also receive and distribute to the MZMs included therein a CW laser beam emitted by the TL 260 and split by the beam splitter 265. The TL 260 is tuned by a tuning signal (T.S.) to emit the CW laser beam at a selected central wavelength of a channel wavelength.

The outputs of the MZMs included in the quadrature modulator 280 are combined to produce an X-polarization IQ signal, and the outputs of the MZMs included in the quadrature modulator 285 are combined to produce an IQ signal for Y-polarization. The IQ signal for Y-polarization is then polarized by the PR 290 to produce a Y-polarization IQ signal in a polarization which is orthogonal to a polarization of the X-polarization IQ signal, and the X-polarization IQ signal and the Y-polarization IQ signal with their polarizations orthogonal to each other are fed into the PBC 295 for combination thereby. The PBC 295 outputs a polarization multiplexed signal which is provided to the MUX or the switching/routing unit.

Reference is now additionally made to FIG. 3, which is a simplified block diagram illustration of a DSP-enabled optical receiver 300 that uses coherent detection, the DSP-enabled optical receiver 300 being comprised in the apparatus 100 of FIG. 1 and having a capability of using a set of adjustable transmission parameters.

The DSP-enabled optical receiver 300 may form the optical receiver part of every one of the following in the apparatus 100: every one of the L protection DSP-enabled optical transceivers/transponders 120; and every one working DSP-enabled optical transceiver/transponder 110 having a capability of using the set of adjustable transmission parameters of any one of the L protection DSP-enabled optical transceivers/transponders 120, irrespective of any specific set of transmission parameters, such as the first set of transmission parameters or the second set of transmission parameters, which it is configured to use. In the non-limiting example of FIG. 1, each optical receiver 160-ADJ may be implemented by one DSP-enabled optical receiver 300.

The DSP-enabled optical receiver 300 includes a receiver DSP/ASIC (Rx DSP/ASIC) 305 and a receiver (Rx) opto-electronic front end 310. The DSP-enabled optical receiver 300 is operative to receive an optical signal from the DeMUX or the switching/routing unit mentioned above with reference to FIG. 1 via the Rx opto-electronic front end 310 and to convert the received optical signal into a binary signal.

The Rx DSP/ASIC 305 includes two FEC decoding units 315, two de-mapping units 320, a 2×2 adaptive equalizer and phase recovery unit 325, and two chromatic dispersion (CD) compensation units 330. Each FEC decoding unit 315 includes a module 335 which includes a plurality of FEC decoders, and switches/selectors 340 and 345 which enable selection of one of the plurality of FEC decoders. Each module 335 may also include an optional NO FEC route, a selection of which by the respective switches/selectors 340 and 345 skips performance of FEC decoding. Alternatively, each module 335 may be bypassed via a route external to the respective FEC decoding unit 315 for skipping FEC decoding. Each FEC decoding unit 315 typically matches the FEC encoding unit 215 of the DSP-enabled optical transmitter 200, and hence each of the modules 335 includes two FEC decoders referred to as FEC DEC. 1 and FEC DEC. 2, and also the NO FEC route. In a case where the FEC encoding unit 215 includes other FEC encoders and/or more than two FEC encoders, each of the modules 335 typically includes FEC decoders matching actual FEC encoders in the FEC encoding unit 215.

Each de-mapping unit 320 includes a module 350 which includes a plurality of QAM de-mappers, and switches/selectors 355 and 360 which enable QAM selection of a decided one of the plurality of QAM de-mappers. Each de-mapping unit 320 typically matches the mapping unit 220 of the DSP-enabled optical transmitter 200, and hence each of the modules 350 includes QPSK, 8QAM, 16QAM and 64QAM de-mappers. In a case where the mapping unit 220 includes other de-mappers and/or more than four de-mappers, each of the modules 350 typically includes de-mappers matching actual mappers in the mapping unit 220.

The Rx opto-electronic front end 310 includes a tunable local oscillator (TLO) laser 365, a beam splitter 370, a polarization beam splitter (PBS) 375, two 90° hybrid mixers 380 with differential output, eight photo-detectors (PDs) 385 comprised of four sets of balanced PDs, four linear amplifiers 390 with differential output, and four analog-to-digital converters (ADCs) 395. Each of the hybrid mixers 380 is operative to receive optical signals arriving from the DeMUX or the switching/routing unit and split by the PBS 375, and a CW laser beam emitted by the TLO laser 365 and split by the beam splitter 370. The TLO laser 365 is tuned by a tuning signal (T.S.) to emit the CW laser beam at a selected central wavelength of a channel wavelength.

A first one of the hybrid mixers 380 is operatively associated with four of the PDs 385, and a second one of the hybrid mixers 380 is operatively associated with the other four of the PDs 385. The four PDs 385 associated with the first one of the hybrid mixers 380 are operatively associated with two of the amplifiers 390, which are operatively associated with two of the ADCs 395, respectively, and the four PDs 385 associated with the second one of the hybrid mixers 380 are operatively associated with the other two of the amplifiers 390, which are operatively associated with the other two of the ADCs 395, respectively. The PDs 385 are operative to detect optical signals received thereat and to convert the optical signals into electrical signals, and to provide the electrical signals to the amplifiers 390. The amplifiers 390 are operative to amplify electrical signals received thereat and to provide amplified signals to the ADCs 395 for analog-to-digital conversion thereby.

In operation, an incoming optical signal arriving at the DSP-enabled optical receiver 300 from the DeMUX or the switching/routing unit is split by the PBS 375 into two components X and Y with orthogonal polarizations, which are provided to the hybrid mixers 380. The hybrid mixers 380 also receive a CW laser beam emitted by the TLO laser 365 and split by the beam splitter 370. The first one of the hybrid mixers 380 coherently mixes the polarized optical signal received thereat with the split CW laser beam received thereat and separates the I and Q components of the received optical field in the X-polarization, and the second one of the hybrid mixers 380 coherently mixes the polarized optical signal received thereat with the split CW laser beam received thereat and separates the I and Q components of the received optical field in the Y-polarization.

The PDs 385 associated with the first one of the hybrid mixers 380 detect the I and Q components of the received optical field in the X-polarization and output analog electrical signals to the two amplifiers 390 associated therewith, which in turn amplify the analog electrical signals and provide amplified analog electrical signals to the ADCs 395 associated therewith for digitization thereby. The PDs 385 associated with the second one of the hybrid mixers 380 detect the I and Q components of the received optical field in the Y-polarization and output analog electrical signals to the two amplifiers 390 associated therewith, which in turn amplify the analog electrical signals and provide amplified analog electrical signals to the ADCs 395 associated therewith for digitization thereby.

After digitization by the ADCs 395, digital signals associated with the X-polarization are provided to one of the CD compensation units 330 and digital signals associated with the Y-polarization are provided to the other one of the CD compensation units 330. The CD compensation units 330 perform fiber CD compensation on the digital signals received thereat and provide CD compensated signals to the 2×2 adaptive equalizer and phase recovery unit 325. The 2×2 adaptive equalizer and phase recovery unit 325 performs adaptive equalization, including automatic polarization tracking and polarization mode dispersion (PMD) and residual CD compensation, and carrier phase recovery.

After adaptive equalization and carrier phase recovery, the digital signals associated with the X-polarization are provided to a first one of the two de-mapping units 320 where the digital signals associated with the X-polarization are de-mapped, according to a QAM de-mapping decision, to produce a first de-mapped signal, and the digital signals associated with the Y-polarization are provided to a second one of the two de-mapping units 320 where the digital signals associated with the Y-polarization are de-mapped, according to the QAM de-mapping decision, to produce a second de-mapped signal. The first de-mapped signal then either bypasses FEC decoding and exits the DSP-enabled optical receiver 300 or undergoes FEC decoding in a first one of the two FEC decoding units 315 according to a FEC coding selection and then exits the DSP-enabled optical receiver 300. Similarly, the second de-mapped signal either bypasses FEC decoding and exits the DSP-enabled optical receiver 300 or undergoes FEC decoding in a second one of the two FEC decoding units 315 according to the FEC coding selection and then exits the DSP-enabled optical receiver 300.

Every DSP-enabled optical transceiver/transponder that includes the DSP-enabled optical transmitter 200 and the DSP-enabled optical receiver 300 has performance adjustability capabilities which may be expressed in terms of parameter selection capabilities and are determined by the following: the module 230 in the DSP-enabled optical transmitter 200 and the matching modules 335 in the DSP-enabled optical receiver 300; the module 245 in the DSP-enabled optical transmitter 200 and the matching modules 350 in the DSP-enabled optical receiver 300; and the TL 260 in the DSP-enabled optical transmitter 200 and the matching TLO laser 365 in the DSP-enabled optical receiver 300. For example, a QAM mapping selection enabled by the modules 245 and 350, alone or in combination with a FEC coding selection enabled by the modules 230 and 335, may be used to adjust a symbol rate and a net bit rate and hence a client port rate, and such selections may be expressed in terms of a selection of a value for the symbol rate parameter and a selection of a value for the client port rate parameter. In another example, a tuning selection of the TL 260 and TLO laser 365 may be used to adjust a central wavelength of a channel wavelength, and such selection may be expressed in terms of a selection of a value for the parameter of a central wavelength of a channel wavelength.

The parameter selection capabilities of every DSP-enabled optical transceiver/transponder that includes the DSP-enabled optical transmitter 200 and the DSP-enabled optical receiver 300 may be represented by a two-dimensional table including, for example, columns for the following five parameters: the modulation scheme parameter; the FEC coding overhead percent parameter; the symbol rate parameter; the parameter of a central wavelength of a channel wavelength; and the client port rate parameter, and rows with values from groups of values or from ranges of values for each of the five parameters. It is appreciated that the two-dimensional table may, by way of a non-limiting example, be implemented as a look-up table (LUT).

It is, however, appreciated that the DSP-enabled optical transmitter 200 and the DSP-enabled optical receiver 300, and every DSP-enabled optical transceiver/transponder comprising them may alternatively have configurations with less than the above-mentioned performance adjustability capabilities. The less performance adjustability capabilities refers to less parameters to select from and/or to smaller groups of parameter values or smaller ranges of parameter values to select from. For simplicity of description, and without limiting the generality of the foregoing, a configuration of the DSP-enabled optical transmitter 200 having less than the above-mentioned performance adjustability capabilities is referred to as a less-encompassing DSP-enabled optical transmitter, a configuration of the DSP-enabled optical receiver 300 having less than the above-mentioned performance adjustability capabilities is referred to as a less-encompassing DSP-enabled optical receiver, and a configuration of a DSP-enabled optical transceiver/transponder comprising a less-encompassing DSP-enabled optical transmitter and a less-encompassing DSP-enabled optical receiver is referred to as a less-encompassing DSP-enabled optical transceiver/transponder.

When the DSP-enabled optical transmitter 200 and the DSP-enabled optical receiver 300 are in a configuration forming a specific less-encompassing DSP-enabled optical transmitter and a specific less-encompassing DSP-enabled optical receiver, respectively, each of the L protection DSP-enabled optical transceivers/transponders 120 and each working DSP-enabled optical transceiver/transponder 110 that includes a DSP-enabled optical transceiver/transponder having a capability of using a set of adjustable transmission parameters of one of the L protection DSP-enabled optical transceivers/transponders 120 may typically include a less-encompassing DSP-enabled optical transceiver/transponder including the specific less-encompassing DSP-enabled optical transmitter and the specific less-encompassing DSP-enabled optical receiver.

A non-limiting example of a less-encompassing DSP-enabled optical transmitter and a less-encompassing DSP-enabled optical receiver is a configuration of the DSP-enabled optical transmitter 200 and the DSP-enabled optical receiver 300 in which a fixed FEC code is used. In such configuration there is no FEC adjustability capability, that is, FEC encoding/decoding selection is not enabled, and the FEC encoding unit 215 of the transmitter 200 reduces to a single FEC encoder in the less-encompassing DSP-enabled optical transmitter, and each of the two FEC decoding units 315 of the receiver 300 reduces to a single FEC decoder in the less-encompassing DSP-enabled optical receiver.

Another non-limiting example of a less-encompassing DSP-enabled optical transmitter and a less-encompassing DSP-enabled optical receiver is a configuration of the DSP-enabled optical transmitter 200 and the DSP-enabled optical receiver 300 in which a fixed QAM mapping/de-mapping is used. In such configuration there is no QAM mapping adjustability capability, that is, QAM mapping/de-mapping selection is not enabled and the mapping unit 220 of the transmitter 200 reduces to a single QAM mapper in the less-encompassing DSP-enabled optical transmitter, and each of the two de-mapping units 320 of the receiver 300 reduces to a single QAM de-mapper in the less-encompassing DSP-enabled optical receiver.

Still another non-limiting example of a less-encompassing DSP-enabled optical transmitter and a less-encompassing DSP-enabled optical receiver is a configuration of the DSP-enabled optical transmitter 200 and the DSP-enabled optical receiver 300 in which there are less QAM mapping/de-mapping possibilities to select from, namely there is a smaller variety of available QAM mappers/de-mappers to select from. For example, which is not meant to be limiting, the mapping unit 220 of the less-encompassing DSP-enabled optical transmitter may include only three QAM mappers from which selection can be made instead of the four QAM mappers in the mapping unit 220 in the transmitter 200, and each of the two de-mapping units 320 of the less-encompassing DSP-enabled optical receiver may include only three QAM de-mappers from which selection can be made instead of the four QAM de-mappers in each of the de-mapping units 320 in the receiver 300.

The two-dimensional table for the less-encompassing DSP-enabled optical transmitter and the less-encompassing DSP-enabled optical receiver has a smaller number of columns and/or a smaller number of rows than the two-dimensional table for the DSP-enabled optical transmitter 200 and the DSP-enabled optical receiver 300. A smaller number of columns reflect a smaller number of parameters to select from, and a smaller number of rows reflect a smaller group of selectable values and/or a smaller range of selectable values for one or more of the parameters.

The configurations of the DSP-enabled optical transmitter 200 and the DSP-enabled optical receiver 300 which lead to the less-encompassing DSP-enabled optical transmitter and the less-encompassing DSP-enabled optical receiver typically result from hardware and/or software differences between the Tx DSP/ASIC 205 and/or the TL 260 in the DSP-enabled optical transmitter 200 and the Tx DSP/ASIC 205 and/or the TL 260 in the less-encompassing DSP-enabled optical transmitter, respectively, and between the Rx DSP/ASIC 305 and/or the TLO laser 365 in the DSP-enabled optical receiver 300 and the Rx DSP/ASIC 305 and/or the TLO laser 365 in the less-encompassing DSP-enabled optical receiver, respectively. By way of example, a less-encompassing DSP-enabled optical transmitter which is a configuration of the DSP-enabled optical transmitter 200 in which QAM mapping is not selectable differs from the DSP-enabled optical transmitter 200 in that a single QAM mapper replaces the mapping unit 220 and such difference may result from a hardware and/or software difference between the Tx DSP/ASIC 205 in the DSP-enabled optical transmitter 200 and the Tx DSP/ASIC 205 in the less-encompassing DSP-enabled optical transmitter, and a corresponding less-encompassing DSP-enabled optical receiver which is a configuration of the DSP-enabled optical receiver 300 in which QAM de-mapping is not selectable differs from the DSP-enabled optical receiver 300 in that two single QAM de-mappers respectively replace the two de-mapping units 320 and such difference may result from a hardware and/or software difference between the Rx DSP/ASIC 305 in the DSP-enabled optical receiver 300 and the Rx DSP/ASIC 305 in the less-encompassing DSP-enabled optical receiver.

By way of another example, a less-encompassing DSP-enabled optical transmitter which is a configuration of the DSP-enabled optical transmitter 200 in which FEC encoding is not selectable differs from the DSP-enabled optical transmitter 200 in that a single FEC encoder replaces the FEC encoding unit 215 and such difference may result from a hardware and/or software difference between the Tx DSP/ASIC 205 in the DSP-enabled optical transmitter 200 and the Tx DSP/ASIC 205 in the less-encompassing DSP-enabled optical transmitter, and a corresponding less-encompassing DSP-enabled optical receiver which is a configuration of the DSP-enabled optical receiver 300 in which FEC decoding is not selectable differs from the DSP-enabled optical receiver 300 in that two single FEC decoders respectively replace the two FEC decoding units 315 and such difference may result from a hardware and/or software difference between the Rx DSP/ASIC 305 in the DSP-enabled optical receiver 300 and the Rx DSP/ASIC 305 in the less-encompassing DSP-enabled optical receiver.

By way of still another example, a less-encompassing DSP-enabled optical transmitter which is a configuration of the DSP-enabled optical transmitter 200 in which a central wavelength of a channel wavelength is selectable from a smaller wavelength range than in the DSP-enabled optical transmitter 200 may differ from the DSP-enabled optical transmitter 200 in type of TL 260 used and hence in hardware, and a corresponding less-encompassing DSP-enabled optical receiver which is a configuration of the DSP-enabled optical receiver 300 in which a central wavelength of a channel wavelength is selectable from a smaller wavelength range than in the DSP-enabled optical receiver 300 may differ from the DSP-enabled optical receiver 300 in type of TLO laser 365 used and hence in hardware.

In respect of a DSP-enabled optical transceiver/transponder having a capability of using a set of adjustable transmission parameters which does not enable it to protect every one of the N working DSP-enabled optical transceivers/transponders 110, as mentioned above, such DSP-enabled optical transceiver/transponder, irrespective of whether it is configured to use the first set of transmission parameters or the second set of transmission parameters, may include a less-adjustable version of the DSP-enabled optical transmitter 200 and a corresponding less-adjustable version of the DSP-enabled optical receiver 300.

The less-adjustable version of the DSP-enabled optical transmitter 200 and the less-adjustable version of the DSP-enabled optical receiver 300 may be similar in structure and functionality to the less-encompassing DSP-enabled optical transmitter and the less-encompassing DSP-enabled optical receiver, respectively. However, since a less-encompassing DSP-enabled optical transceiver/transponder with a less-encompassing DSP-enabled optical transmitter and a less-encompassing DSP-enabled optical receiver may form any one of the L protection DSP-enabled optical transceivers/transponders 120 and since, as mentioned above with reference to FIG. 1, the enablement of each of the L protection DSP-enabled optical transceivers/transponders 120 to protect every one of the N working DSP-enabled optical transceivers/transponders 110 is typically obtained when all sets of transmission parameters actually used by the N working DSP-enabled optical transceivers/transponders 110 are within adjustability ranges/values covered by each set of adjustable transmission parameters of each of the L protection DSP-enabled optical transceivers/transponders 120, performance adjustability capabilities of the less-encompassing DSP-enabled optical transmitter are greater than and typically encompass performance adjustability capabilities of the less-adjustable version of the DSP-enabled optical transmitter 200 and performance adjustability capabilities of the less-encompassing DSP-enabled optical receiver are greater than and typically encompass performance adjustability capabilities of the less-adjustable version of the DSP-enabled optical receiver 300.

For example, if, as shown by way of a non-limiting example in FIGS. 2 and 3, the performance adjustability capabilities of the DSP-enabled optical transmitter 200 and the DSP-enabled optical receiver 300 enable four QAM mapping/de-mapping possibilities to select from, which include QPSK, 8QAM, 16QAM and 64QAM, the less-encompassing DSP-enabled optical transmitter and the less-encompassing DSP-enabled optical receiver may have only three QAM mapping/de-mapping possibilities to select from, such as QPSK, 8QAM and 16QAM, and the less-adjustable version of the DSP-enabled optical transmitter 200 and the less-adjustable version of the DSP-enabled optical receiver 300 may have only two QAM mapping/de-mapping possibilities to select from, such as QPSK and 8QAM.

Figure 4:
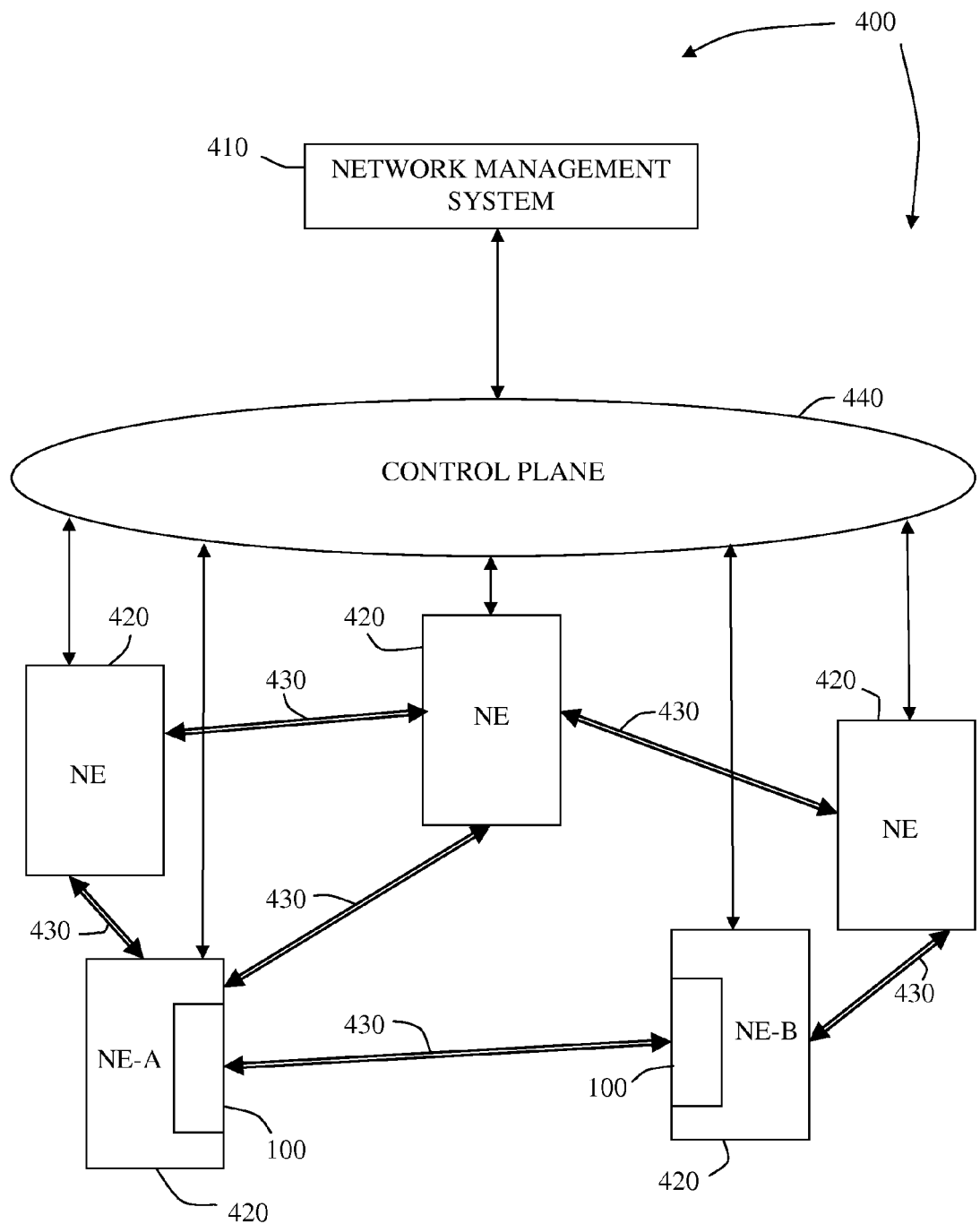
FIG. 4 is a simplified block diagram illustration of an optical network utilizing the apparatus of FIG. 1, the optical network being constructed and operative in accordance with an embodiment of the present invention.

Reference is now additionally made to FIG. 4, which is a simplified block diagram illustration of an optical network utilizing the apparatus 100 of FIG. 1, the optical network being constructed and operative in accordance with an embodiment of the present invention.

The optical network of FIG. 4, which is generally designated 400, includes a network management system (NMS) 410, a plurality of network elements (NEs) 420 that communicate with one another via links 430, and a control plane 440. Each link 430 may, by way of a non-limiting example, include both working paths and protection paths.

Each NE 420 includes one apparatus 100 for communication with another NE 420, and optionally additional apparatuses 100 for communication with additional NEs 420. Alternatively, for each NE 420 the one apparatus 100 as well as the optional additional apparatuses 100 may be external to the NE 420 and operatively associated therewith. In cases where any ones of the apparatuses 100 are external to any ones of the NEs 420, the external ones of the apparatuses 100 may operate under instructions from the associated NEs 420 or from the NMS 410.

The NEs 420 may be located at nodes (not shown) of the network 400 and may, for example, include routers and reconfigurable optical add-drop multiplexers (ROADMs). One or more of the NEs 420 may each include the MUX and DeMUX or the switching/routing unit mentioned above with reference to FIG. 1. Each MUX and DeMUX in an NE 420 may be comprised in and/or associated with the one apparatus 100 of the NE 420.

For simplicity of depiction and description, and without limiting the generality of the foregoing, only two of the NEs 420 in FIG. 4, which are designated NE-A and NE-B, are depicted as including one apparatus 100 each, but it is appreciated that NE-A and NE-B may also include additional apparatuses 100, and each of the other NEs 420 may include one apparatus 100 or a plurality thereof. Each of NE-A and NE-B uses the set of N working DSP-enabled optical transceivers/transponders 110 in the apparatus 100 included therein for communication with each other over working paths in the link 430 associated with NE-A and NE-B, and the set of M protection DSP-enabled optical transceivers/transponders 120 in the apparatus 100 included therein for communication protection over protection paths in the link 430 associated with NE-A and NE-B.

The NMS 410 is shown in FIG. 4 and referred to below as a unit which is separate from the NEs 420, but in some embodiments, the NMS 410 may form one of the NEs 420 or be comprised in one of the NEs 420. The NMS 410 is operatively associated with the NEs 420 via the control plane 440 and is operative to control the NEs 420, typically via the control plane 440 using, for example, routing and signaling control modules (not shown). The control plane 440 may further be used in responding to requests, selections and control instructions generated by the NMS 410 and/or by one or more of the NEs 420.

In operation, the NEs 420 may communicate with one another via the links 430 under control of and management by the NMS 410. The NMS 410 may also apply a recovery scheme for use in the optical network 400, and, in accordance with an embodiment of the present invention, each NE 420, alone or in combination with the NMS 410, operates the apparatus 100 and the optional additional apparatuses 100 included therein or associated therewith, and the apparatuses 100 of the NEs 420 are operated as described above with reference to FIG. 1. When operated as described above with reference to FIG. 1, the N working DSP-enabled optical transceivers/transponders 110 of each apparatus 100 operate as working transceivers/transponders and the M protection DSP-enabled optical transceivers/transponders 120 of each apparatus 100 operate as protection transceivers/transponders.

In accordance with another embodiment of the present invention, a first DSP-enabled optical transceiver/transponder having a capability of using adjustable transmission parameters, which may be any one of the L protection DSP-enabled optical transceivers/transponders 120 in one apparatus 100 of one NE 420 in the network 400, may be used in any one of two modes of operation. One of the two modes of operation is a protection mode of operation and the other mode of operation is an association mode of operation.

In the protection mode of operation, the first DSP-enabled optical transceiver/transponder is used as a protection DSP-enabled optical transceiver/transponder as described above with reference to FIG. 1 to protect one of a plurality of working DSP-enabled optical transceivers/transponders. The one of a plurality of working DSP-enabled optical transceivers/transponders may, for example, be one of the N working DSP-enabled optical transceivers/transponders 110 in the one apparatus 100 of the one NE 420 in the network 400.

In the association mode of operation, the first DSP-enabled optical transceiver/transponder is used together with a second DSP-enabled optical transceiver/transponder having a capability of using adjustable transmission parameters to jointly overcome a change in at least one transmission parameter over a working path associated with the second DSP-enabled optical transceiver/transponder. The second DSP-enabled optical transceiver/transponder may, for example, be another one of the N working DSP-enabled optical transceivers/transponders 110 in the one apparatus 100 of the one NE 420 in the network 400, and the working path associated with the second DSP-enabled optical transceiver/transponder may be a working path associated with the another one of the N working DSP-enabled optical transceivers/transponders 110.

A non-limiting example of the change in at least one transmission parameter over the working path associated with the second DSP-enabled optical transceiver/transponder is a change in client port rate. The change in client port rate may, for example, occur in a case where a variable rate client interface communicating with the second DSP-enabled optical transceiver/transponder at a desired bit rate experiences at some point a failure which is only partly resolved by using, instead of the variable rate client interface, a fixed rate client interface which is capable of communicating with the second DSP-enabled optical transceiver/transponder at only half the desired bit rate. In such a case, the first DSP-enabled optical transceiver/transponder may be operated in the association mode of operation to join the second DSP-enabled optical transceiver/transponder and communicate at half the desired bit rate with another fixed rate client interface over an additional working path so that communication using the first DSP-enabled optical transceiver/transponder together with the second DSP-enabled optical transceiver/transponder reaches the desired bit rate over a link comprising both the working path and the additional working path.

In some embodiments, an operation mode of the first DSP-enabled optical transceiver/transponder is determined as one of the protection mode of operation and the association mode of operation prior to using the first DSP-enabled optical transceiver/transponder. The first DSP-enabled optical transceiver/transponder is then used in the determined one of the protection mode of operation and the association mode of operation. In one embodiment, the operation mode of the first DSP-enabled optical transceiver/transponder is determined via the control plane 440.

In some embodiments, using the first DSP-enabled optical transceiver/transponder in the protection mode of operation includes detecting a failure in the one of a plurality of working DSP-enabled optical transceivers/transponders, configuring adjustable transmission parameters of the first DSP-enabled optical transceiver/transponder to correspond to transmission parameters of the one of a plurality of working DSP-enabled optical transceivers/transponders, and using the first DSP-enabled optical transceiver/transponder for communication instead of the one of a plurality of working DSP-enabled optical transceivers/transponders.

In some embodiments, using the first DSP-enabled optical transceiver/transponder in the association mode of operation includes configuring adjustable transmission parameters of the first and second DSP-enabled optical transceivers/transponders to enable the first and second DSP-enabled optical transceivers/transponders to jointly overcome the change in at least one transmission parameter over the working path associated with the second DSP-enabled optical transceiver/transponder, and using the first DSP-enabled optical transceiver/transponder together with the second DSP-enabled optical transceiver/transponder for communication over a link comprising the working path associated with the second DSP-enabled optical transceiver/transponder and an additional working path associated with the first DSP-enabled optical transceiver/transponder.

Reference is now made to FIG. 5, which is a simplified flowchart illustration of a method of enabling an M:N recovery scheme in an optical network of the type of the optical network 400 of FIG. 4, in accordance with an embodiment of the present invention.

The M:N recovery scheme is enabled in the optical network by allocating a set of M protection DSP-enabled optical transceivers/transponders for protecting a set of N working DSP-enabled optical transceivers/transponders (step 500), wherein M and N are positive integers and $1 \leq M < N$. The set of N working DSP-enabled optical transceivers/transponders includes at least one working DSP-enabled optical transceiver/transponder that uses a first set of transmission parameters and at least one working DSP-enabled optical transceiver/transponder that uses a second set of transmission parameters which is different from the first set of transmission parameters. The set of M protection DSP-enabled optical transceivers/transponders includes L protection DSP-enabled optical transceivers/transponders, each having a capability of using a set of adjustable transmission parameters enabling it to protect every one of the N working DSP-enabled optical transceivers/transponders, and, when M>L, M−L protection DSP-enabled optical transceivers/transponders, each having a capability of protecting at least one, but not all, of the N working DSP-enabled optical transceivers/transponders, wherein L is a positive integer and $1 \leq L \leq M$.

Figure 6:
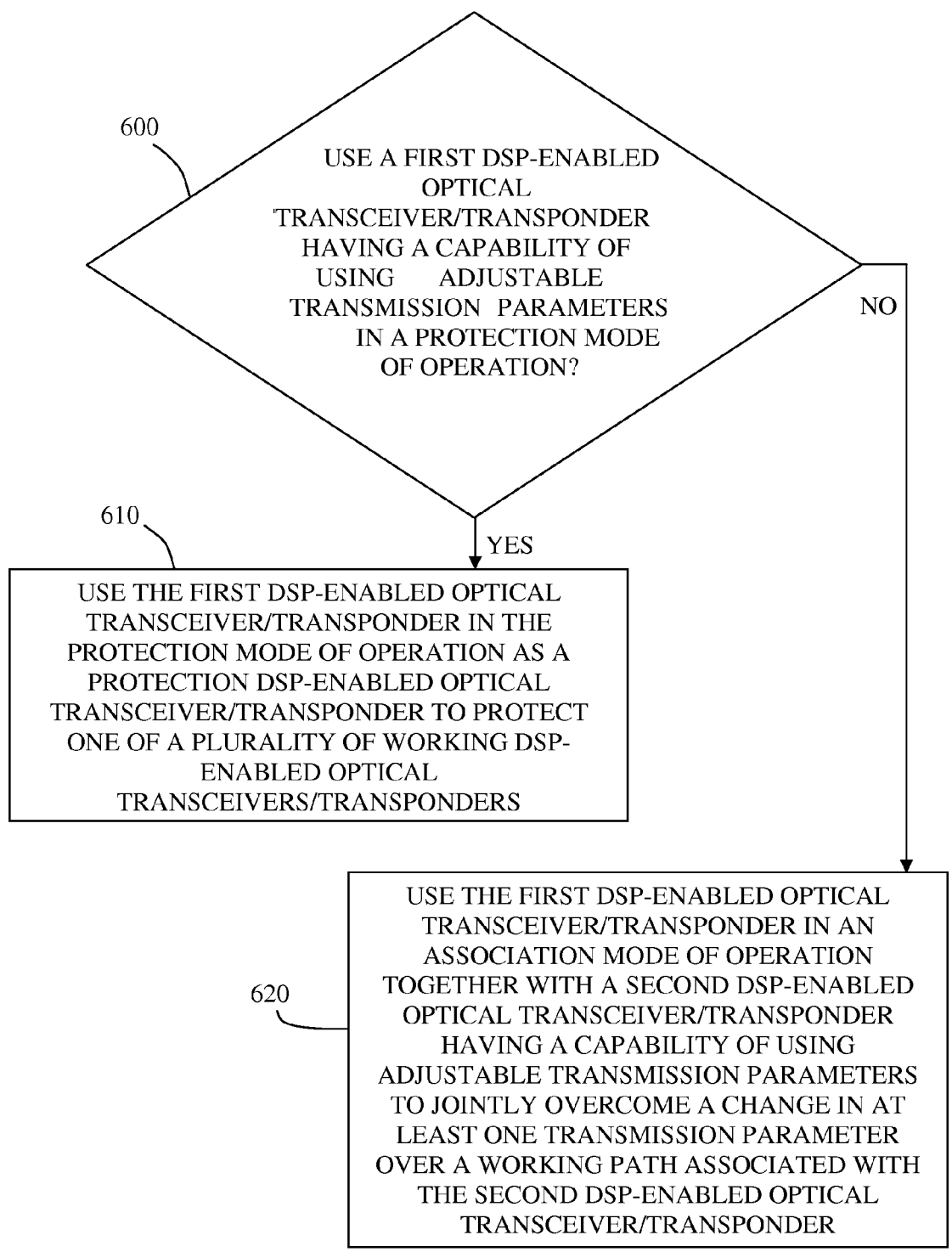
FIG. 6 is a simplified flowchart illustration of a method of using a DSP-enabled optical transceiver/transponder having a capability of using adjustable transmission parameters in an optical network of the type of the optical network of FIG. 4, in accordance with an embodiment of the present invention.

Reference is now made to FIG. 6, which is a simplified flowchart illustration of a method of using a DSP-enabled optical transceiver/transponder having a capability of using adjustable transmission parameters in an optical network of the type of the optical network 400 of FIG. 4, in accordance with an embodiment of the present invention.

A determination is made whether a first DSP-enabled optical transceiver/transponder having a capability of using adjustable transmission parameters is to be used in the optical network in a protection mode of operation or in an association mode of operation (step 600).

If it is determined that the first DSP-enabled optical transceiver/transponder is to be used in the protection mode of operation, the first DSP-enabled optical transceiver/transponder is used as a protection DSP-enabled optical transceiver/transponder to protect one of a plurality of working DSP-enabled optical transceivers/transponders (step 610).

If it is determined that the first DSP-enabled optical transceiver/transponder is to be used in the association mode of operation, the first DSP-enabled optical transceiver/transponder is used together with a second DSP-enabled optical transceiver/transponder having a capability of using adjustable transmission parameters to jointly overcome a change in at least one transmission parameter over a working path associated with the second DSP-enabled optical transceiver/transponder (step 620).

Figure 7:
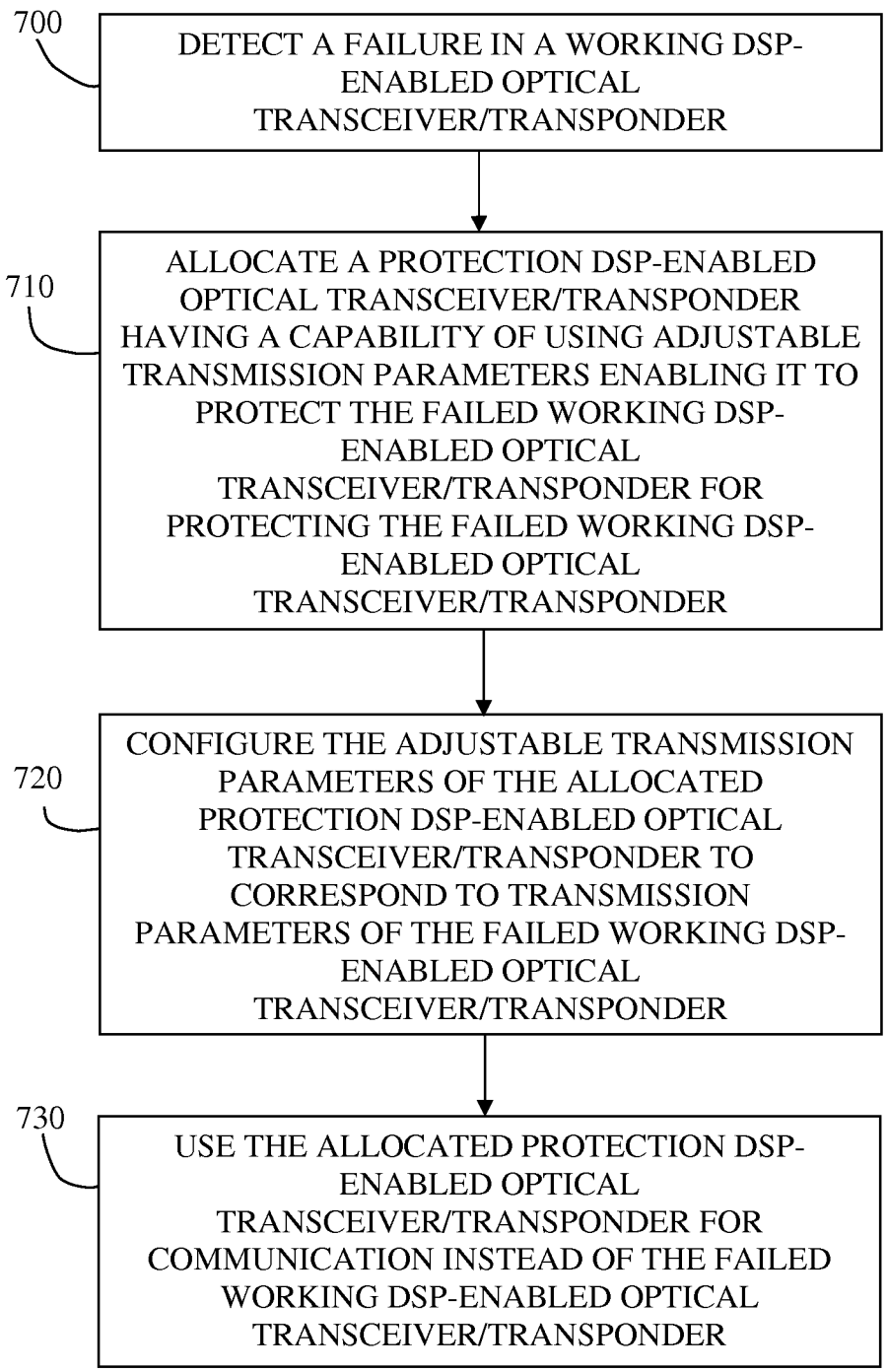
FIG. 7 is a simplified flowchart illustration of a method of protecting a working DSP-enabled optical transceiver/transponder in an optical network of the type of the optical network of FIG. 4, in accordance with an embodiment of the present invention.

Reference is now made to FIG. 7, which is a simplified flowchart illustration of a method of protecting a working DSP-enabled optical transceiver/transponder in an optical network of the type of the optical network 400 of FIG. 4, in accordance with an embodiment of the present invention.

A failure in the working DSP-enabled optical transceiver/transponder is detected (step 700). The failure may, for example, be detected via a control plane of the optical network.

In response to detection of the failure, a protection DSP-enabled optical transceiver/transponder having a capability of using adjustable transmission parameters enabling it to protect the failed working DSP-enabled optical transceiver/transponder is allocated for protecting the failed working DSP-enabled optical transceiver/transponder (step 710). The adjustable transmission parameters of the allocated protection DSP-enabled optical transceiver/transponder are configured to correspond to transmission parameters of the failed working DSP-enabled optical transceiver/transponder (step 720), and the allocated protection DSP-enabled optical transceiver/transponder is used for communication instead of the failed working DSP-enabled optical transceiver/transponder (step 730).

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof.

What is claimed is:

1. Apparatus for protecting an optical network, the apparatus comprising:
   (a) a plurality (N) of working digital signal processing (DSP)-enabled optical transceivers/transponders, which plurality comprises (i) a first working DSP-enabled optical transceiver/transponder that uses a first set of transmission parameters including first indicia of a first modulation scheme, and (ii) a second working DSP-enabled optical transceiver/transponder that uses a second set of transmission parameters including second indicia of a second modulation scheme that is different from the first modulation scheme; and
   (b) a protection DSP-enabled optical transceiver/transponder operable to use (i) the first set of transmission parameters, in response to a signal indicating a failure of the first working DSP-enabled optical transceiver/transponder, to communicate optical signals in place of the failed first working DSP-enabled optical transceiver/transponder, and (ii) the second set of transmission parameters, in response to a signal indicating a failure of the second working DSP-enabled optical transceiver/transponder, to communicate optical signals in place of the failed second working DSP-enabled optical transceiver/transponder.

2. The apparatus of claim 1 further comprising at least one additional protection DSP-enabled optical transceiver/transponder that, together with the protection DSP-enabled optical transceiver/transponder of part (b), forms a set of M protection DSP-enabled optical transceivers/transponders operable to protect the N working DSP-enabled optical transceivers/transponders, wherein M<N.

3. The apparatus of claim 2 wherein the set of M protection DSP-enabled optical transceivers/transponders comprises (i) a subset of L protection DSP-enabled optical transceivers/transponders, each of the L protection DSP-enabled optical transceivers/transponders able to use a set of adjustable transmission parameters to protect any one of the N working DSP-enabled optical transceivers/transponders, and (ii) M-L protection DSP-enabled optical transceivers/transponders, each able to protect at least one, but not all, of the N working DSP-enabled optical transceivers/transponders.

4. The apparatus of claim 3 wherein at least some of the L protection DSP-enabled optical transceivers/transponders each can adjust the adjustable transmission parameters within an identical range.

5. The apparatus of claim 3 wherein at least some of the L protection DSP-enabled optical transceivers/transponders each can adjust the adjustable transmission parameters within different ranges.

6. The apparatus of claim 1:
   (i) wherein the N working DSP-enabled optical transceivers/transponders further comprise a third working DSP-enabled optical transceiver/transponder that uses a third set of transmission parameters including third indicia of a third modulation scheme that is different from the first modulation scheme and different from the second modulation scheme;
   (ii) wherein the protection DSP-enabled optical transceiver/transponder of part (b) is not able to use the third set of transmission parameters, in response to a signal indicating a failure of the third working DSP-enabled optical transceiver/transponder, to communicate optical signals in place of the failed third working DSP-enabled optical transceiver/transponder; and
   (iii) further comprising an additional protection DSP-enabled optical transceiver/transponder operable to use (A) the first set of transmission parameters, in response to a signal indicating a failure of the first working DSP-enabled optical transceiver/transponder, to communicate optical signals in place of the failed first working DSP-enabled optical transceiver/transponder, (B) the second set of transmission parameters, in response to a signal indicating a failure of the second working DSP-enabled optical transceiver/transponder, to communicate optical signals in place of the failed second working DSP-enabled optical transceiver/transponder, and (C) the third set of transmission parameters, in response to a signal indicating a failure of the third working DSP-enabled optical transceiver/transponder, to communicate optical signals in place of the failed third working DSP-enabled optical transceiver/transponder.

7. The apparatus of claim 1 wherein the first indicia of the first modulation scheme and the second indicia of the second modulation scheme (i) both indicate polarization multiplexing (PM), and (ii) respectively indicate different ones of the following: quadrature phase shift keying (QPSK); 8 phase shift keying (8PSK); 8 quadrature amplitude modulation (8QAM); 16QAM; 32QAM; 64QAM; 128QAM; time-domain hybrid QPSK/8QAM; time-domain hybrid 8QAM/16QAM; and time-domain hybrid 32QAM/64QAM.

8. The apparatus of claim 1 wherein the first set of transmission parameters further defines a first forward error correction (FEC) coding overhead percent value and the second set of transmission parameters further defines a second FEC coding overhead percent value, and wherein the first FEC coding overhead percent value and the second FEC coding overhead percent value differ from one another.

9. The apparatus of claim 8 wherein the first value and the second value are each one of the following: substantially 7%; substantially 13%; substantially 20%; and substantially 25%.

10. The apparatus of claim 1 wherein the first set of transmission parameters further defines a first symbol rate and the second set of transmission parameters further defines a second symbol rate, and wherein the first symbol rate and the second symbol rate differ from one another.

11. The apparatus of claim 1 wherein the first set of transmission parameters further defines a first client port rate and the second set of transmission parameters further defines a second client port rate, and wherein the first client port rate and the second client port rate differ from one another.

12. The apparatus of claim 11 wherein the first port rate and the second port rate are each one of the following: substantially 100 Gb/s; substantially 200 Gb/s; substantially 400 Gb/s; substantially 1 Tb/s; substantially 1600 Gb/s; and a variable bit rate.

13. The apparatus of claim 1 wherein:
(i) the first working DSP-enabled optical transceiver/transponder uses a set of fixed transmission parameters; and
(ii) the second working DSP-enabled optical transceiver/transponder is operable to use a set of adjustable transmission parameters.

14. Apparatus for protecting an optical network, the apparatus comprising:
(a) a plurality (N) of working digital signal processing (DSP)-enabled optical transceivers/transponders, which plurality comprises (i) a first working DSP-enabled optical transceiver/transponder that uses a first set of transmission parameters defining a first forward error correction (FEC) coding overhead percent value, and (ii) a second working DSP-enabled optical transceiver/transponder that uses a second set of transmission parameters defining a second FEC coding overhead percent value that is different from the first FEC coding overhead percent value; and
(b) a protection DSP-enabled optical transceiver/transponder operable to use (i) the first set of transmission parameters, in response to a signal indicating a failure of the first working DSP-enabled optical transceiver/transponder, to communicate optical signals in place of the failed first working DSP-enabled optical transceiver/transponder, and (ii) the second set of transmission parameters, in response to a signal indicating a failure of the second working DSP-enabled optical transceiver/transponder, to communicate optical signals in place of the failed second working DSP-enabled optical transceiver/transponder.

15. The apparatus of claim 14 wherein the first value and the second value are each one of the following: substantially 7%; substantially 13%; substantially 20%; and substantially 25%.

16. The apparatus of claim 14:
(i) wherein the N working DSP-enabled optical transceivers/transponders further comprise a third working DSP-enabled optical transceiver/transponder that uses a third set of transmission parameters defining a third FEC coding overhead percent value that is different from the first FEC coding overhead percent value and different from the second FEC coding overhead percent value;
(ii) wherein the protection DSP-enabled optical transceiver/transponder of part (b) is not able to use the third set of transmission parameters, in response to a signal indicating a failure of the third working DSP-enabled optical transceiver/transponder, to communicate optical signals in place of the failed third working DSP-enabled optical transceiver/transponder; and
(iii) further comprising an additional protection DSP-enabled optical transceiver/transponder operable to use (A) the first set of transmission parameters, in response to a signal indicating a failure of the first working DSP-enabled optical transceiver/transponder, to communicate optical signals in place of the failed first working DSP-enabled optical transceiver/transponder, (B) the second set of transmission parameters, in response to a signal indicating a failure of the second working DSP-enabled optical transceiver/transponder, to communicate optical signals in place of the failed second working DSP-enabled optical transceiver/transponder, and (C) the third set of transmission parameters, in response to a signal indicating a failure of the third working DSP-enabled optical transceiver/transponder, to communicate optical signals in place of the failed third working DSP-enabled optical transceiver/transponder.

17. Apparatus for protecting an optical network, the apparatus comprising:
(a) a plurality (N) of working digital signal processing (DSP)-enabled optical transceivers/transponders, which plurality comprises (i) a first working DSP-enabled optical transceiver/transponder that uses a first set of transmission parameters defining a first symbol rate, and (ii) a second working DSP-enabled optical transceiver/transponder that uses a second set of transmission parameters defining a second symbol rate that is different from the first symbol rate; and
(b) a protection DSP-enabled optical transceiver/transponder operable to use (i) the first set of transmission parameters, in response to a signal indicating a failure of the first working DSP-enabled optical transceiver/transponder, to communicate optical signals in place of the failed first working DSP-enabled optical transceiver/transponder, and (ii) the second set of transmission parameters, in response to a signal indicating a failure of the second working DSP-enabled optical transceiver/transponder, to communicate optical signals in place of the failed second working DSP-enabled optical transceiver/transponder.

18. The apparatus of claim 17:
(i) wherein the N working DSP-enabled optical transceivers/transponders further comprise a third working DSP-enabled optical transceiver/transponder that uses a third set of transmission parameters defining a third symbol rate that is different from the first symbol rate and different from the second symbol rate;
(ii) wherein the protection DSP-enabled optical transceiver/transponder of part (b) is not able to use the third set of transmission parameters, in response to a signal indicating a failure of the third working DSP-enabled optical transceiver/transponder, to communicate optical signals in place of the failed third working DSP-enabled optical transceiver/transponder; and
(iii) further comprising an additional protection DSP-enabled optical transceiver/transponder operable to use (A) the first set of transmission parameters, in response to a signal indicating a failure of the first working DSP-enabled optical transceiver/transponder, to communicate optical signals in place of the failed first working DSP-enabled optical transceiver/transponder, (B) the second set of transmission parameters, in response to a signal indicating a failure of the second working DSP-enabled optical transceiver/transponder, to communicate optical signals in place of the failed second working DSP-enabled optical transceiver/transponder, and (C) the third set of transmission parameters, in response to a signal indicating a failure of the third working DSP-enabled optical transceiver/transponder, to communicate optical signals in place of the failed third working DSP-enabled optical transceiver/transponder.

19. Apparatus for protecting an optical network, the apparatus comprising:
(a) a plurality (N) of working digital signal processing (DSP)-enabled optical transceivers/transponders, which plurality comprises (i) a first working DSP-enabled optical transceiver/transponder that uses a first set of transmission parameters defining a first client port rate, and (ii) a second working DSP-enabled optical transceiver/transponder that uses a second set of transmission parameters defining a second client port rate that is different from the first client port rate; and
(b) a protection DSP-enabled optical transceiver/transponder operable to use (i) the first set of transmission parameters, in response to a signal indicating a failure of the first working DSP-enabled optical transceiver/transponder, to communicate optical signals in place of the failed first working DSP-enabled optical transceiver/transponder, and (ii) the second set of transmission parameters, in response to a signal indicating a failure of the second working DSP-enabled optical transceiver/transponder, to communicate optical signals in place of the failed second working DSP-enabled optical transceiver/transponder.

20. The apparatus of claim 19 wherein the first port rate and the second port rate are each one of the following: substantially 100 Gb/s; substantially 200 Gb/s; substantially 400 Gb/s; substantially 1 Tb/s; substantially 1600 Gb/s; and a variable bit rate.

21. The apparatus of claim 19:
(i) wherein the N working DSP-enabled optical transceivers/transponders further comprise a third working DSP-enabled optical transceiver/transponder that uses a third set of transmission parameters defining a third client port rate that is different from the first client port rate and different from the second client port rate;
(ii) wherein the protection DSP-enabled optical transceiver/transponder of part (b) is not able to use the third set of transmission parameters, in response to a signal indicating a failure of the third working DSP-enabled optical transceiver/transponder, to communicate optical signals in place of the failed third working DSP-enabled optical transceiver/transponder; and
(iii) further comprising an additional protection DSP-enabled optical transceiver/transponder operable to use (A) the first set of transmission parameters, in response to a signal indicating a failure of the first working DSP-enabled optical transceiver/transponder, to communicate optical signals in place of the failed first working DSP-enabled optical transceiver/transponder, (B) the second set of transmission parameters, in response to a signal indicating a failure of the second working DSP-enabled optical transceiver/transponder, to communicate optical signals in place of the failed second working DSP-enabled optical transceiver/transponder, and (C) the third set of transmission parameters, in response to a signal indicating a failure of the third working DSP-enabled optical transceiver/transponder, to communicate optical signals in place of the failed third working DSP-enabled optical transceiver/transponder.

22. Apparatus for protecting an optical network, the apparatus comprising:
(a) a plurality (N) of working digital signal processing (DSP)-enabled optical transceivers/transponders, which plurality comprises (i) a first working DSP-enabled optical transceiver/transponder that uses a first set of transmission parameters, (ii) a second working DSP-enabled optical transceiver/transponder that uses a second set of transmission parameters that is different from the first set of transmission parameters, and (iii) a third working DSP-enabled optical transceiver/transponder that uses a third set of transmission parameters different from the first set of transmission parameters and different from the second set of transmission parameters;
(b) a protection DSP-enabled optical transceiver/transponder operable to use (i) the first set of transmission parameters, in response to a signal indicating a failure of the first working DSP-enabled optical transceiver/transponder, to communicate optical signals in place of the failed first working DSP-enabled optical transceiver/transponder, and (ii) the second set of transmission parameters, in response to a signal indicating a failure of the second working DSP-enabled optical transceiver/transponder, to communicate optical signals in place of the failed second working DSP-enabled optical transceiver/transponder, wherein the protection DSP-enabled optical transceiver/transponder is not able to use the third set of transmission parameters, in response to a signal indicating a failure of the third working DSP-enabled optical transceiver/transponder, to communicate optical signals in place of the failed third working DSP-enabled optical transceiver/transponder; and
(c) an additional protection DSP-enabled optical transceiver/transponder operable to use (i) the first set of transmission parameters, in response to a signal indicating a failure of the first working DSP-enabled optical transceiver/transponder, to communicate optical signals in place of the failed first working DSP-enabled optical transceiver/transponder, (ii) the second set of transmission parameters, in response to a signal indicating a failure of the second working DSP-enabled optical transceiver/transponder, to communicate optical signals in place of the failed second working DSP-enabled optical transceiver/transponder, and (iii) the third set of transmission parameters, in response to a signal indicating a failure of the third working DSP-enabled optical transceiver/transponder, to communicate optical signals in place of the failed third working DSP-enabled optical transceiver/transponder.

23. A method of protecting an optical network, which optical network comprises a plurality (N) of working digital signal processing (DSP)-enabled optical transceivers/transponders, which plurality comprises (i) a first working DSP-enabled optical transceiver/transponder that uses a first set of transmission parameters including first indicia of a first modulation scheme, and (ii) a second working DSP-enabled optical transceiver/transponder that uses a second set of transmission parameters including second indicia of a second modulation scheme that is different from the first modulation scheme, the method comprising:

(a) in response to a signal indicating a failure of the first working DSP-enabled optical transceiver/transponder, causing a protection DSP-enabled optical transceiver/transponder to use the first set of transmission parameters to communicate optical signals in place of the failed first working DSP-enabled optical transceiver/transponder, and (b) in response to a signal indicating a failure of the second working DSP-enabled optical transceiver/transponder, causing the protection DSP-enabled optical transceiver/transponder to use the second set of transmission parameters to communicate optical signals in place of the failed second working DSP-enabled optical transceiver/transponder.

24. A method of protecting an optical network, which optical network comprises a plurality (N) of working digital signal processing (DSP)-enabled optical transceivers/transponders, which plurality comprises (i) a first working DSP-enabled optical transceiver/transponder that uses a first set of transmission parameters defining a first forward error correction (FEC) coding overhead percent value, and (ii) a second working DSP-enabled optical transceiver/transponder that uses a second set of transmission parameters defining a second FEC coding overhead percent value that is different from the first FEC coding overhead percent value, the method comprising:

(a) in response to a signal indicating a failure of the first working DSP-enabled optical transceiver/transponder, causing a protection DSP-enabled optical transceiver/transponder to use the first set of transmission parameters to communicate optical signals in place of the failed first working DSP-enabled optical transceiver/transponder, and (b) in response to a signal indicating a failure of the second working DSP-enabled optical transceiver/transponder, causing the protection DSP-enabled optical transceiver/transponder to use the second set of transmission parameters to communicate optical signals in place of the failed second working DSP-enabled optical transceiver/transponder.

* * * * *